(12) United States Patent
Greenberger

(10) Patent No.: US 6,675,187 B1
(45) Date of Patent: Jan. 6, 2004

(54) PIPELINED LINEAR ARRAY OF PROCESSOR ELEMENTS FOR PERFORMING MATRIX COMPUTATIONS

(75) Inventor: Alan Joel Greenberger, South Whitehall Township, Lehigh County, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/556,760

(22) Filed: Apr. 21, 2000

Related U.S. Application Data

(60) Provisional application No. 60/138,423, filed on Jun. 10, 1999.

(51) Int. Cl.[7] .............................................. G06F 7/52
(52) U.S. Cl. ..................................................... 708/622
(58) Field of Search .............................. 708/520, 524, 708/511, 607, 620, 622, 625, 628, 513; 712/23, 24, 222

(56) References Cited

U.S. PATENT DOCUMENTS

| | | | | |
|---|---|---|---|---|
| 4,354,249 A | * | 10/1982 | King et al. .................. | 708/622 |
| 5,195,050 A | * | 3/1993 | Hsu et al. .................... | 708/420 |
| 5,764,943 A | * | 6/1998 | Wechsler ..................... | 712/218 |
| 5,983,253 A | * | 11/1999 | Fischer et al. ............... | 708/300 |
| 6,002,880 A | * | 12/1999 | Slavenburg ................... | 712/24 |
| 6,038,583 A | * | 3/2000 | Oberman et al. ............. | 708/628 |
| 6,411,979 B1 | * | 6/2002 | Greenberger ................ | 708/622 |

OTHER PUBLICATIONS

J. H. Moreno and T. Lang, "Matrix Computations on Systolic–Type Arrays," Kluwer Academic Publishers, Boston MA, pp. 108–111, 167–169, 199–203, and 206–210, 1992.

* cited by examiner

Primary Examiner—Chuong Dinh Ngo
(74) Attorney, Agent, or Firm—Ryan, Mason & Lewis, LLP

(57) ABSTRACT

A pipelined linear array of processor elements (PEs) for performing matrix computations in an efficient manner. The linear array generally includes a head PE and a set of regular PEs, the head PE being a functional superset of the regular PE, with interconnections between nearest neighbor PEs in the array and a feedback path from a non-neighbor regular PE back to the head PE. Each PE includes arithmetic circuitry for performing multiply, combine and accumulate operations, and a register file for storing inputs and outputs of the arithmetic circuitry. The head PE further includes a non-linear function generator. Each PE is pipelined such that the latency for an arithmetic operation to complete is a multiple of the period with which new operations can be initiated. A Very Large Instruction Word (VLIW) program or other type of program may be used to control the array. The array is particularly efficient at performing complex matrix operations, such as, e.g., the solution of a set of linear equations, matrix inversion, matrix-matrix multiplication, and computation of covariance and cross correlation.

36 Claims, 13 Drawing Sheets

| 1 | → | 2 | → | 3 | → | 4 | → | 5 | → | 6 |
|---|---|---|---|---|---|---|---|---|---|---|
| <u>aaaay</u> | | <u>aaaay</u> | | <u>aaaay</u> | | <u>aaaay</u> | | <u>aaaay</u> | | <u>aaaay</u> |
| xxxxx | | xxxxx | | xxxxx | | xxxxx | | xxxxx | | xxxxx |
| 0xxxx | | 0xxxx | | 0xxxx | | 0xxxx | | 0xxxx | | 0xxxx |
| xxxxx | | 0xxxx | | 0xxxx | | 00xxx | | 00xxx | | 00xxx |
| xxxxx | | xxxxx | | 0xxxx | | 0xxxx | | 00xxx | | 000xx |

PARALLEL

SYSTOLIC

PIPELINED LINEAR ARRAY OF PROCESSOR ELEMENTS FOR PERFORMING MATRIX COMPUTATIONS

PRIORITY CLAIM

The present application claims the priority of U.S. Provisional Application No. 60/138,423 filed Jun. 10, 1999 in the name of inventor A. J. Greenberger and entitled "Pipelined Linear Processor Array for QR Decomposition."

FIELD OF THE INVENTION

The present invention relates generally to processor elements and techniques, and more particularly to pipelined processing devices comprising arrays of processor elements for performing matrix computations.

BACKGROUND OF THE INVENTION

As advances in technology enable manufacturers to put more wires and transistors on a single integrated circuit, new opportunities arise for performing digital signal processing operations that previously would have been impractical.

An example of one such emerging application is the use of adaptive beamforming for arrays of antennas in a base station of a wireless communication system. The objective in this case is to allow more mobile users and higher data rates in a given cell. This is achieved by adding together the signals received by multiple antennas with time varying complex weights, in order to form a radiation pattern which points toward the mobile of interest and includes nulls on sources of interference. Various solutions for optimizing this type of problem are known and involve performing computations with matrices and vectors of complex numbers. See, e.g., S. Haykin, "Adaptive Filter Theory," $3^{rd}$ ed., Prentice Hall, 1996. Instead of only a single complex multiplication being called for at a given time, there is the need for massive numbers of complex multiplications.

Another emerging application of this type is multi-user detection for wireless system base stations using Direct Sequence Code Division Multiple Access (DS-CDMA) coding. In these algorithms, as described in, e.g., S. Moshavi, "Multi-User Detection for DS-CDMA Communications," p. 124, IEEE Communications Magazine, October 1996, collective knowledge gained in real time about the various mobiles that are interfering with each other is used to un-entangle that interference and improve the detection of each individual mobile. These algorithms also involve intensive calculations with matrices of complex numbers.

The above-noted emerging applications for wireless base stations often use variations of well-known algorithms which make use of fundamental matrix computations. The four operations typically of most interest are:
1. Solution of a set of n linear equations with n unknowns. One possible approach is to triangulate the set of equations using QR decomposition via Givens rotations, and then solve the set of triangulated equations by back substitution.
2. Matrix inversion. One possible approach is to triangulate a set of equations using QR decomposition via Givens rotations, and then solve the set of triangulated equations for the inverse by multiple back substitutions.
3. Matrix-matrix multiplication.
4. Covariance and cross correlation. One often needs to compute such statistics on vectors of input signals in order to form matrices and vectors that are further processed.

Conventional techniques for performing each of these operations will be described in greater detail below.

In the case of determining the solution of a set of linear equations, the problem in matrix notation may be expressed as:

$$Ax=y \qquad (1)$$

where A is a known square matrix of complex values, y is a known vector of complex values, and x is an unknown complex vector. There are numerous techniques for the numerical solution of such equations. However, some of these techniques suffer from numerical instabilities. A numerically robust technique for solving Equation (1) is known as QR decomposition or QR factorization via Givens rotations, and is described in, e.g., G. H. Golub and C. F. Van Loan, "Matrix Computations," $3^{rd}$ ed., Johns Hopkins Univ. Pr., 1996. This approach involves factoring the matrix A into the product:

$$A=QR \qquad (2)$$

where Q is a unitary matrix and R is a right upper triangular matrix. The meaning of "right upper triangular" is that all of the components of R below the main diagonal are zeroes. Then, both sides of Equation (1) are multiplied by the conjugate transpose (i.e., the Hermitian transpose) of Q, denoted $Q^H$.

$$Q^H Ax = Q^H y \qquad (3)$$

Substituting Equation (2) into Equation (3) gives:

$$Q^H QRx = Q^H y \qquad (4)$$

Since $Q^H Q$ equals the Identity matrix, Equation (4) reduces to:

$$Rx = Q^H y \qquad (5)$$

Equation (5) is in a form that can be solved easily for each component of x using a technique known as "back substitution." The term "back substitution" refers to an iterative method where first the bottom row of the matrices in Equation (5), which has the most zeroes and only one unknown, is solved. Then the solution is substituted into the next row above, and that row is then solved. This process continues until all the rows of the matrices in Equation (5) are solved.

An effective and numerically stable method for finding the unitary matrix $Q^H$ is as a product of individual so-called "Givens rotations," each one of which zeroes out one element of the preceding matrix without disturbing the previously placed zeroes. See, e.g., W. Givens, "Computation of Plane Unitary Rotations Transforming a General Matrix To Triangular Form," J. Soc. Indust. Appl. Math., Vol. 6, No. 1, p. 26, March 1958. Givens rotations are also known in the art as being useful for performing Recursive Least Squares adaptive algorithms.

An example illustrating the triangulation of a small matrix equation using Givens rotations will now be described, with reference to FIGS. 1 through 5. Equation (6) below is an expansion of Equation (1) showing the individual matrix and vector elements for the example.

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} x_1 \\ x_2 \\ x_3 \\ x_4 \end{pmatrix} = \begin{pmatrix} y_1 \\ y_2 \\ y_3 \\ y_4 \end{pmatrix} \quad (6)$$

FIG. 1 shows the stages of the corresponding Givens rotations. In the six stages shown in FIG. 1, zeroes are successively placed in a five by four array. The letters at the head of each array indicate that four of the columns are elements of the matrix A being transformed and the fifth column has elements of the vector y being transformed. The zeroes in bold type indicate the zeroes that are being placed in each stage. Equation (7) below shows in more detail how one does the first unitary transformation in stage one of FIG. 1. More particularly, one applies a two by two complex unitary matrix to the first two rows to force one element to a zero, the other elements all being transformed to new values. The "*" symbol indicates the complex conjugate.

$$\begin{pmatrix} c^* & s^* \\ -s & c \end{pmatrix} \quad (7)$$

$$\begin{pmatrix} a_{11} & a_{12} & a_{13} & a_{14} & y_1 \\ a_{21} & a_{22} & a_{23} & a_{24} & y_2 \end{pmatrix} = \begin{pmatrix} a'_{11} & a'_{12} & a'_{13} & a'_{14} & y'_1 \\ 0 & a'_{22} & a'_{23} & a'_{24} & y'_2 \end{pmatrix}$$

By multiplying out the matrices to find the element which is being forced to zero, one arrives at the equation:

$$-sa_{11}+ca_{21}=0 \quad (8)$$

together with the unitary constraint:

$$|s|^2+|c|^2=1 \quad (9)$$

These equations may be satisfied by:

$$c = \frac{a_{11}}{\sqrt{|a_{11}|^2 + |a_{21}|^2}} \quad \text{and} \quad (10)$$

$$s = \frac{a_{21}}{\sqrt{|a_{11}|^2 + |a_{21}|^2}} \quad (11)$$

The value of the non-zero transformed element $a_{11}'$ is:

$$a'_{11} = \frac{|a_{11}|^2 + |a_{21}|^2}{\sqrt{|a_{11}|^2 + |a_{21}|^2}}, \quad (12)$$

a real number. The matrix also "rotates" all other elements on the two rows.

It is well known that QR decomposition using Givens rotations, as described above, can be solved rapidly in a triangular shaped two dimensional systolic array. See, e.g., W. M. Gentleman and H. T. Kung, "Matrix triangularization by systolic arrays," SPIE V. 298, p. 19, 1981.

FIGS. 2–5 show the beginning of the procedure for triangulating a five by four matrix equation on a triangular array of processor elements (PEs). The round boxes in FIGS. 2 through 5 are special "head" elements that compute the c, s, and updated element as described in Equations (10)–(12) above. The square boxes are "regular" elements that rotate two elements using c and s. They also propagate c and s to the right. In Step 1 of the Givens rotation, shown in FIG. 2, the first c1 and s1 are calculated. In Step 2, shown in FIG. 3, the second c2 and s2 are calculated and the first square box in the uppermost row of elements uses c1 and s1 to do a rotation. In Step 3, shown in FIG. 4, the third c3 and s3 are calculated, the first square box uses c2 and s2 to do a rotation, and the second square box uses c1 and s1 to do a rotation. In Step 4, shown in FIG. 5, the head element of the second row can recursively begin to calculate the fourth c4 and s4. The square boxes above the head element of the second row are still doing rotations. The calculation proceeds systolically through the triangular array.

Note that there exists some opportunity in this problem to reduce the latency of the computation by a recursive procedure. After two zeroes have been placed in a given column, it is possible to begin placing zeroes in the next column to the right simultaneous to continuing to place further zeroes in the original column. The degree of parallelism available increases with the size of the matrix equation being processed.

There is a variation of the above-described architecture in which computations are performed in parallel instead of systolically. In this variation, once c1 and s1 are known, they can be transmitted simultaneously to all the square boxes to the right of the head element and all the rotations using those values of c1 and s1 can be performed in parallel. It should be noted that the computation of c and s in the head element is computationally intensive because absolute square and reciprocal square root are required.

FIG. 6 illustrates generally how data is processed over time in the two architectures for QR decomposition using Givens rotations. In the parallel case, an approximately horizontal band of processor elements is busy at any one time. Over time, the band sweeps downward through the triangular array as shown. In the systolic case, an angled band of active processor elements sweeps downward through the triangular array, maintaining its angle downward through the array. It is apparent that in both cases there is poor utilization of the processor elements. In the QR decomposition of a larger matrix, most of the processor elements are idle at any given time. For example, with a matrix equation of size 17 columns×16 rows at the peak of the computation, up to five rows worth of processor elements in the triangle can be active at once, assuming the optimum latency reduction. Nonetheless, on the average, only a small percentage of processor elements can be kept busy.

It is therefore desirable to find an architecture for performing QR decomposition and other types of matrix computations that is more efficient than the two dimensional triangular array described above. One approach is to consider a one dimensional processor array and sequentially map the operations of the virtual two dimensional array onto the physical one dimensional array. Such an approach is described in G. Lightbody, R. Walke, R. Woods, and J. McCanny, "Novel Mapping of a Linear QR Architecture," ICASSP99: IEEE Int. Conf. Acoust., Speech, Signal Proc., p. 1933, 1999. This approach uses a remapping and scheduling scheme to map from a two dimensional triangular array to a linear array which achieves high processor element utilization. However, the total latency of the algorithm is much longer than that for the replaced triangular array. Also, in order for this approach to achieve 100% hardware utilization, it is necessary to interleave the steps of two independent triangulation problems, the second beginning when the first is half finished.

Another approach, described in J. H. Moreno and T. Lang, "Matrix Computations on Systolic-Type Arrays," pp. 206–210, Kluwer Academic Publishers, Boston Mass., 1992, uses a linear array of pipelined PEs to perform matrix algorithms of this type with high utilization.

There exists another technique for dealing with the adaptive antenna array problem described above. A less computationally complex algorithm known as Recursive Least Squares (RLS), as described in, e.g., J. G. McWhirter, "Recursive least-squares minimization using a systolic array," Proc. SPIE V. 431, p. 105, 1983, may be applied to adaptive antenna problems. This approach achieves less than optimum results, but has the advantage of reduced computational complexity. The RLS algorithm avoids the need for the back substitution described above. It is known how to perform the RLS algorithm rapidly on a two dimensional triangular systolic array. Hardware solutions based on this two dimensional array are described in, e.g., B. Haller, Algorithms and VLSI Architectures for RLS-Based Time Reference Beamforming in Mobile Communications," IEEE 1998 Intl. Zurich Seminar on Broadband Comm., p. 29, 1998.

The above-noted conventional back substitution process will now be described in greater detail. As described above, after QR decomposition has been completed, the triangulated set of equations will be in the form of Equation (5), which expanded for the current example is:

$$r_{11}x_1 + r_{12}x_2 + r_{13}x_3 + r_{14}x_4 = y_1 \tag{13}$$

$$r_{22}x_2 + r_{23}x_3 + r_{24}x_4 = y_2$$

$$r_{33}x_3 + r_{34}x_4 = y_3$$

$$r_{44}x_4 = y_4$$

It should be noted that following the Givens procedure described previously, all of the diagonal elements of the R matrix except the last, in this example $r_{11}$, $r_{22}$, and $r_{33}$, are real, and the last diagonal element, in this example $r_{44}$, is complex. One may solve the set of Equations (13) by the back substitution process. More particularly, the last of the four equations, which has only one unknown, $x_4$, may be solved first, e.g., $x_4$ can be obtained by dividing $y_4$ by $r_{44}$. Alternately, the reciprocal, $$\frac{1}{r_{44}},$$

may be computed and then multiplied by $y_4$ to find $x_4$. Then $x_4$ may be substituted into the third of the four equations. The reciprocal of $r_{33}$ may be computed. Then $x_3$ may be found as $$\frac{1}{r_{33}}(y_3 - r_{34}x_4).$$

This process then continues backwards through the equations until all the unknowns are found.

The inverse of a matrix may be found by a procedure involving a series of back substitutions as described above. Assume that one wishes to find the inverse $A^{-1}$ of a matrix A. By definition:

$$AA^{-1}=I \tag{14}$$

where I is the identity matrix. Similar to the discussion above, there is a unitary matrix Q such that:

$$A=QR \tag{15}$$

where R is right triangular. Substituting this into Equation (14) gives $$QRA^{-1}=I \tag{16}$$

One can then proceed to find the Hermitian conjugate of Q, $Q^H$, as the product of a series of Givens rotations as described above. Multiplying both sides of Equation 16 by $Q^H$ gives:

$$RA^{-1}=Q^H \tag{17}$$

Remember that at this time R and $Q^H$ are both known and $A^{-1}$ is the unknown. Since each column of the left side of Equation (17) must equal the corresponding column on the right side, Equation (17) may be broken up into a series of equations:

$$Rx_j=y_j \tag{18}$$

where $x_j$ is a column of $A^{-1}$ and $y_j$ is the corresponding column of $Q^H$. Each of the equations in the series of equations (18) for different values of j looks like the back substitution problem of Equation (5). All of these back substitution problems share a common right triangular matrix, R. Hence the inverse of a matrix can be found by performing QR decomposition via Givens rotations followed by a number of back substitutions.

Another common operation that is performed in advanced processing of arrays of signals is the multiplication of one matrix with another matrix, where the elements of each matrix have complex values. Consider the formation of matrix C by the multiplication of matrices A and B, where in this example each of the three matrices is 4×4 with complex elements. Equation (19) expands this example, showing the matrix elements:

$$\begin{pmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \tag{19}$$

$$\begin{pmatrix} b_{11} & b_{12} & b_{13} & b_{14} \\ b_{21} & b_{22} & b_{23} & b_{24} \\ b_{31} & b_{32} & b_{33} & b_{34} \\ b_{41} & b_{42} & b_{43} & b_{44} \end{pmatrix}$$

Each of the sixteen complex elements of C results from four complex multiplications of elements from a row of A and elements from a column of B. For example:

$$c_{23}=a_{21}b_{13}+a_{22}b_{23}+a_{23}b_{33}+a_{24}b_{43} \tag{20}$$

Thus there are a total of 4×4×4=64 complex multiplications required. The matrix-matrix multiplication of Equation (19) may be computed in many ways on many different hardware architectures. On an ordinary programmable digital computer, there is hardware for multiplying a real number by another real number, but there is normally no hardware assistance beyond that. A program normally performs each complex multiplication as a sum of four real multiplications:

$$a_{21}b_{13}=(a_{21real}b_{13real}-a_{21imaginary}b_{13imaginary}) + i(a_{21real}b_{13imaginary}+a_{21imaginary}b_{13real}) \tag{21}$$

On many current digital computers, the arithmetic hardware for multiply and accumulate has been pipelined such that a new term can begin to be multiplied before the previous term has completed its multiplication and accumulation, thereby improving the throughput of computations such as those shown in Equations (20) and (21).

On existing vector supercomputers, hardware under program control assists in loading vector registers with operands ($a_{21}$, $a_{22}$, etc. in the present example) from memory so they can rapidly be fed to the input of the pipelined multiplication hardware.

Some recent programmable digital signal processors (DSPs) contain more than one multiplier. For example the StarCore SC140 DSP, from Lucent Technologies Inc. Microelectronics Group of Allentown, Pa., contains four arithmetic units each capable of multiplying two real numbers together and accumulating the result, every cycle. If programmed properly, the SC140 can achieve a peak rate of one complex multiply accumulate per cycle in performing the operation of Equation (20).

Two dimensional systolic arrays of PEs have been proposed in U.S. Pat. No. 4,493,048, issued in 1985 in the name of inventors H. T. Kung and C. E. Leiserson and entitled "Systolic Array Apparatuses for Matrix Computations," for performing operations such as matrix-matrix multiplication. Each PE is described as capable of performing a "step" operation consisting of the multiplication of two numbers followed by an accumulate per cycle. In these arrays, the elements of A and B are fed into PEs on the periphery of the array with a particular pattern. The elements of C emerge from PEs on the periphery. Other two dimensional array examples have been described, e.g., in S. Y. Kung, "VLSI Array Processors," p. 213, Prentice Hall, 1988. If such an array were built with each PE capable of performing a complex multiply-accumulate, then the array could have very high performance. However, such an array would be quite costly and it would be difficult to feed the data in and get the data out.

In the above-noted adaptive antenna application, a number of spatially separated antennas all receive the signal from the same set of desired mobile users and undesired sources of interference. By adding together the signals received from the antennas with a particular set of complex weighting values, the adaptive antenna array can be made to have a high gain (directionality) in the direction of one mobile and have nulls in the direction of sources of interference. Let x be a vector of signals received by the antenna array. Ideally for a stationary set of mobiles and interferers and practically for a non-stationary set that is not changing too rapidly, the vector of optimum weights, $w_{opt}$, for detecting a desired signal, $y_d$, is given by the Wiener-Hopf Equation:

$$R_x w_{opt} = r_{xd} \quad (22)$$

where $$R_x = E\{xx^H\} \quad (23)$$

is the complex covariance matrix and $$r_{xd} = E\{xy_d\} \quad (24)$$

is the complex cross correlation vector. The { } operation indicates taking a statistical average over time. In practical situations, that average can be weighted more heavily for recently received data and with decreasing weight for older data. In some practical systems, the transmitter periodically sends a known signal and it is this known signal that is used for $y_d$ to train the system and discover $w_{opt}$.

It is therefore necessary to compute a covariance matrix as in Equation (23) and a cross correlation vector as in Equation (24) fairly frequently. Although both of these procedures are computationally less complex than the matrix-matrix multiplication discussed above, conventional techniques are unable to provide the desired computational efficiency.

In view of the foregoing, it is apparent that a need exists for a more efficient processor element architecture, suitable for use in performing computational operations such as solution of a set of equations via QR decomposition followed by back substitution, as well as other matrix-related operations such as matrix inversion, matrix-matrix multiplication, and computation of covariance and cross correlation.

SUMMARY OF THE INVENTION

The present invention provides an architecture for a pipelined programmable processor element (PE) and a linear array of such PEs that are particularly efficient at performing a variety of matrix operations. In accordance with the invention, each PE includes arithmetic circuitry operative: (i) to multiply real and imaginary parts of at least two complex numbers by real and imaginary parts of at least another two complex numbers, thereby forming at least sixteen partial products, and (ii) to form one or more additive combinations of the partial products, each of the additive combinations representing a real or imaginary number. A register file in each PE includes at least a first port and a second port, each of the first and second ports being capable of reading two complex words or writing two complex words to or from the register file. The ports are coupled to the arithmetic circuitry for supplying the complex numbers thereto and receiving the real or imaginary numbers therefrom.

In accordance with another aspect of the invention, a linear array of PEs suitable for performing matrix computations includes a head PE and a set of regular PEs, the head PE being a functional superset of the regular PE, with interconnections between nearest neighbor PEs in the array and a feedback path from a non-neighbor regular PE back to the head PE. The head PE further includes a non-linear function generator. Each PE is pipelined such that the latency for an arithmetic operation to complete is a multiple of the period with which new operations can be initiated. A Very Large Instruction Word (VLIW) program or other type of program may be used to control the array. The array is particularly efficient at performing complex matrix operations, such as, e.g., the solution of a set of linear equations, matrix inversion, matrix-matrix multiplication, and computation of covariance and cross correlation.

Advantageously, the invention allows matrix computation previously implemented using two dimensional triangular arrays to be implemented in an efficient manner using pipelined linear arrays of processing elements. The invention thus allows matrix computations to be implemented with a substantial reduction in hardware complexity, while providing only a slight increase in latency as a result of the pipelining.

These and other features and advantages of the present invention will become more apparent from the accompanying drawings and the following detailed description.

DETAILED DESCRIPTION OF THE INVENTION

The present invention provides an architecture for a pipelined programmable processor element (PE) and a linear array of such PEs with control that is efficient at performing a variety of matrix operations including, e.g., QR decomposition via Givens rotations, solution of a set of triangulated equations by back substitution, matrix-matrix multiplication, and formation of covariance and cross correlation.

Processor Element Architecture

Figure 7:
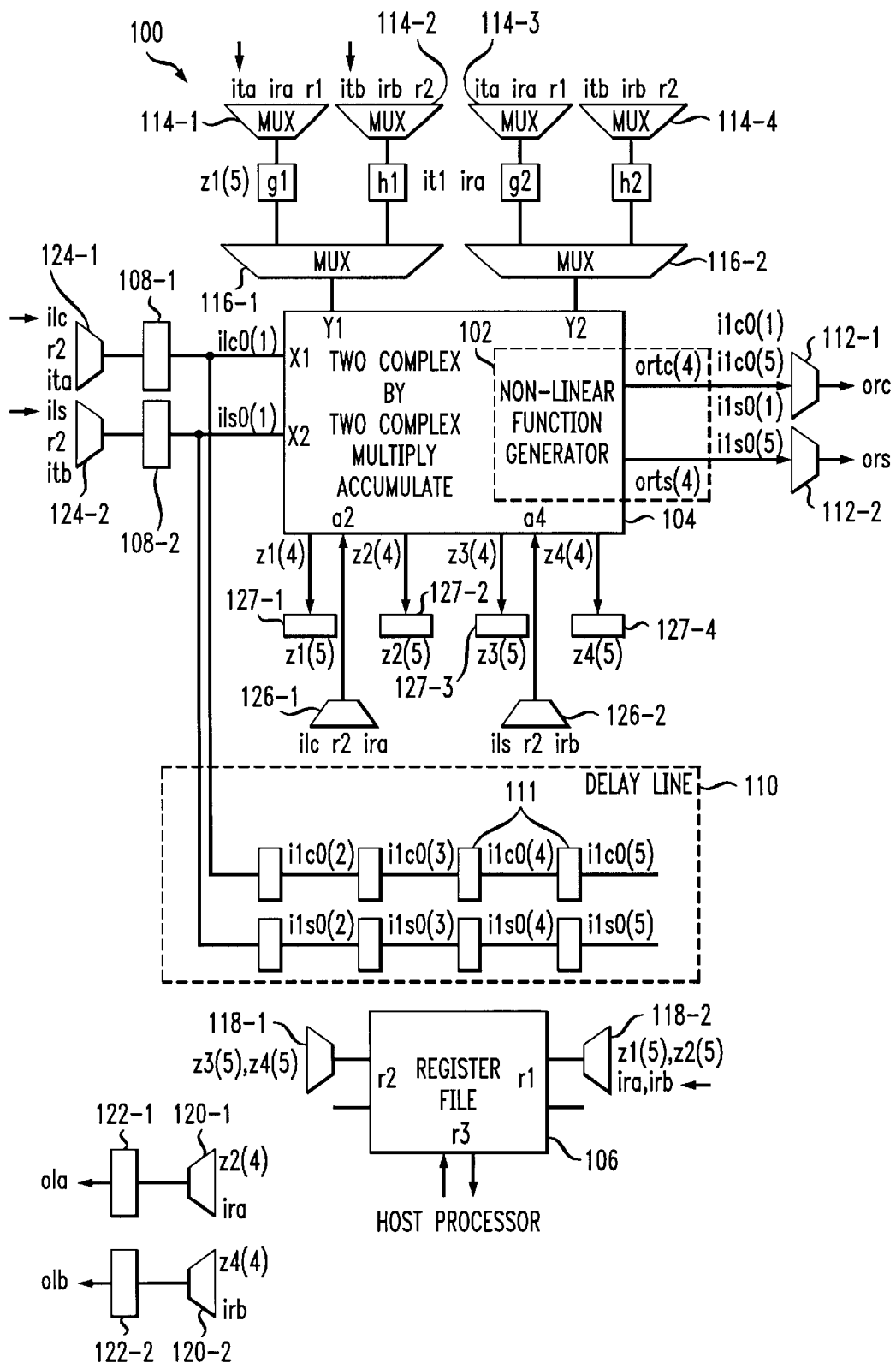
FIG. 7 shows a processor element in accordance with an illustrative embodiment of the present invention.

FIG. 7 shows an illustrative embodiment of a processor element (PE) 100 in accordance with the present invention. As previously noted, pipelined arrays of PEs generally include both regular PEs and a head PE. The PE 100 of FIG. 7 may be viewed as an example of a head PE in accordance with the invention. It has a superset of the functionality of a corresponding regular element. In this illustrative embodiment, the head PE includes all of the elements shown, while the corresponding regular PE includes all elements other than a non-linear function generator 102 that is shown in dashed outline.

Although the PE 100 of FIG. 7 is shown implemented with a five stage pipeline, the same architecture could be also be implemented with pipelines having other lengths.

Element 104 of the PE 100 is a complex multiplier section which implements a Two Complex by Two Complex Multiply Accumulate operation in a manner to be further described below. It also includes the non-linear function generator 102 which may be implemented as a read-only memory (ROM) table driven interpolation engine. The two non-linear functions that may be generated by generator 102 in the illustrative embodiment are inverse square root and reciprocal. The non-linear function generator 102 will also be described in greater detail below.

The PE 100 of FIG. 7 also includes a three port register file 106. Two of the ports of the register file 106, i.e., ports r1 and r2, are used for sources and destinations for temporary storage during the computations. A third port r3 of the register file 106 is dedicated to a host processor, which may write values of data to be operated on or read back results. A host processor may use this third port as a memory directly interfaced to its memory address and data buses. As another example, the third port may be interfaced through a Direct Memory Access (DMA) controller of a type well known in the art of digital processor design. The DMA controller and associated interface logic would facilitate memory transfers between the register files and memory of the host processor, reordering the words as necessary.

To the left of the complex multiplier section 104 are a set of input registers 108-1 and 108-2, also denoted ilc0(1) and ils0(1), respectively. These registers may hold values that have been shifted in from side inputs ilc and ils, or loaded from port 2 of the register file 106, or loaded from top inputs ita and itb. These two registers also feed a delay line 110, shown in dashed outline, that provides delayed output signals via delay elements 111 in order to maintain the systolic pipeline operations required for certain processing algorithms.

At the right side of FIG. 7, output right signals orc and ors each may be driven by one of three possible signals, as selected by multiplexers 112-1 and 112-2, respectively. More particularly, the orc output signal may be one of either ilc0(1), ilc0(5) or ortc(4), and the ors output signal may be one of either ils0(1), ils0(5) or orts(4). The signals ilc0(1) and ils0(1) are used for one cycle systolic transfer algorithms, such as those used to perform matrix-matrix multiplication. The signals ilc0(5) and ils0(5) are outputs of the delay line 110, and are used for multi-cycle systolic transfer algorithms, such as those used to perform QR Decomposition. The signals ortc(4) and orts(4) represent non-linear functions generated by the generator 102.

The PE 100 also includes holding registers g1, h1, g2 and h2, and a number of multiplexers 114-1, 114-2, 114-3, 114-4, 116-1 and 116-2 that allow for a variety of signals to be applied Y1 and Y2 multiplicand inputs of the complex multiplier section 104.

As was described in conjunction with Equation (7) above, the fundamental Givens rotation uses two complex quantities, c and s, to rotate two complex matrix elements by a combination of products such as:

$$a'_{12} = c * a_{12} + s * a_{22} \qquad (25)$$
$$a'_{22} = -sa_{12} + ca_{22}$$

Hence, one of the operations that the PE 100 performs is a Givens rotation such as in Equation (25). The operation in Equation (25) would typically require sixteen real multiplications plus a number of additions on a traditional digital computer or DSP. Instead, the PE 100 of the present invention uses a Two Complex by Two Complex Multiplier in order to perform the Givens rotation more efficiently. This multiplier is described in greater detail in U.S. patent application Ser. No. 09/333,071, filed Jun. 14, 1999 in the name of inventor of A. Greenberger and entitled "Complex Number Multiplier Circuit," which is incorporated by reference herein.

In addition, the complex multiplier section 104 includes feedback from the output back to the input of the final adder stage. More particularly, the z1(5) through z4(5) complex outputs may be written to the register file 106 as shown via multiplexers 118-1 and 118-2. The z1(5) output is fed back as a possible multiplicand input. The z2(4) and z4(4) outputs may be transmitted left to the neighboring PE as ola and olb output left signals, via multiplexers 120-1 and 120-2 and registers 122-1 and 122-2, respectively.

Port r1 of the register file 106 may also be written with up to two complex words that come from the PE to its right through inputs ira and irb. The values on the ira, irb inputs may be propagated left through ola, olb. The inputs ita and itb allow data to enter the PE 100 directly via multiplexers 124-1 and 124-2, respectively, without coming from a neighboring PE.

Inputs a2 and a4 of the complex multiplier section 104 are driven by the outputs of multiplexers 126-1 and 126-2, respectively. The z1(4) to z4(4) outputs of the section 104 are applied to registers 127-1, 127-2, 127-3 and 127-4 as shown.

Figure 8:
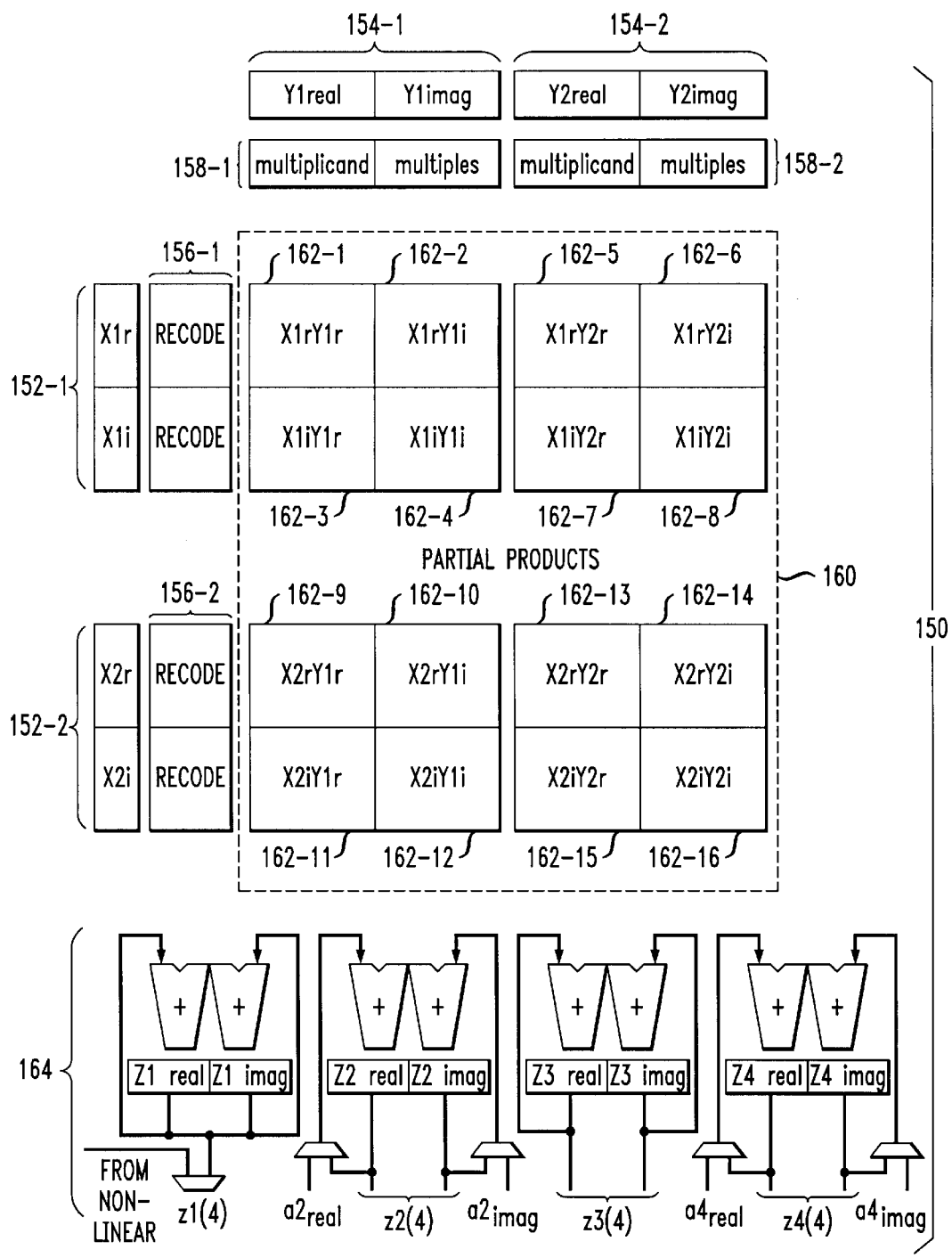
FIG. 8 shows a multiplier portion of the processor element of FIG. 7 in greater detail.

FIG. 8 shows the block architecture of a Two Complex by Two Complex Multiplier 150 that may be implemented in the complex multiplier section 104 of FIG. 7. On the left side of FIG. 8 are sets of input registers 152-1 and 152-2 which hold complex numbers X1 and X2, respectively, to be multiplied. The complex numbers X1 and X2 are referred to herein as "multipliers." On the top of FIG. 8 are sets of input registers 154-1 and 154-2 which hold complex numbers Y1 and Y2, respectively, to be multiplied. The complex numbers Y1 and Y2 are referred to as "multiplicands."

The multiplier 150 performs multi-bit recoding on the left, using recode elements 156-1 and 156-2, and performs multiplicand multiple formation on the top, using multiplicand multiple elements 158-1 and 158-2. The sixteen partial products of the four real numbers on the left and the four real numbers on the top are formed in the central box 160. Each partial product box 162-1, 162-2, . . . 162-16 of the central box 160 contains multiplexers and adders.

At the bottom of FIG. 8 is an additional set of adder circuitry 164 which includes eight final adders for forming the real and imaginary parts of up to four complex results, z1 through z4. The "(4)" of z1(4) in FIG. 8 refers to the pipeline stage in the computation. Not explicitly shown in FIG. 8 are the outputs of the appropriate partial products being routed to the inputs of the eight final adders.

Also shown in FIG. 8 are feedback paths that go from z2-4(4) and the input to the z1(4) multiplexer back to the preceding pipeline stage so that accumulations can be done. The final adders for z2(4) and z4(4) also are shown having the possibility of alternate inputs, a2 and a4, that can be added at the preceding pipelinestage. In the PE 100 of FIG. 7, the multiplexers 126-1 and 126-2 allow these two alternate inputs to come from ilc, r2, and ira for a2 and ils, r2, and irb, for a4.

The non-linear function generator 102 of FIG. 7 will now be described in greater detail. As was mentioned above, the desired functions for matrix computations are typically inverse square root and reciprocal. There are many known numerical methods for computing these functions, including power series expansions, iterative recursion formulas, and interpolation. See, e.g., C. T. Fike, "Computer Evaluation of Mathematical Functions," Prentice Hall, 1968. Improvements in integrated circuit technology have made interpolation methods more practical by allowing large "lookup" tables to be stored in chip-based memory. These tables generally contain data for a function on a grid of points, such that the function at a desired point can then be computed by interpolation. One advantage of this interpolation technique is that it applies to any function which remains well behaved over a range. As a result, the same or similar hardware engine can be utilized for producing different functions.

Figure 9:
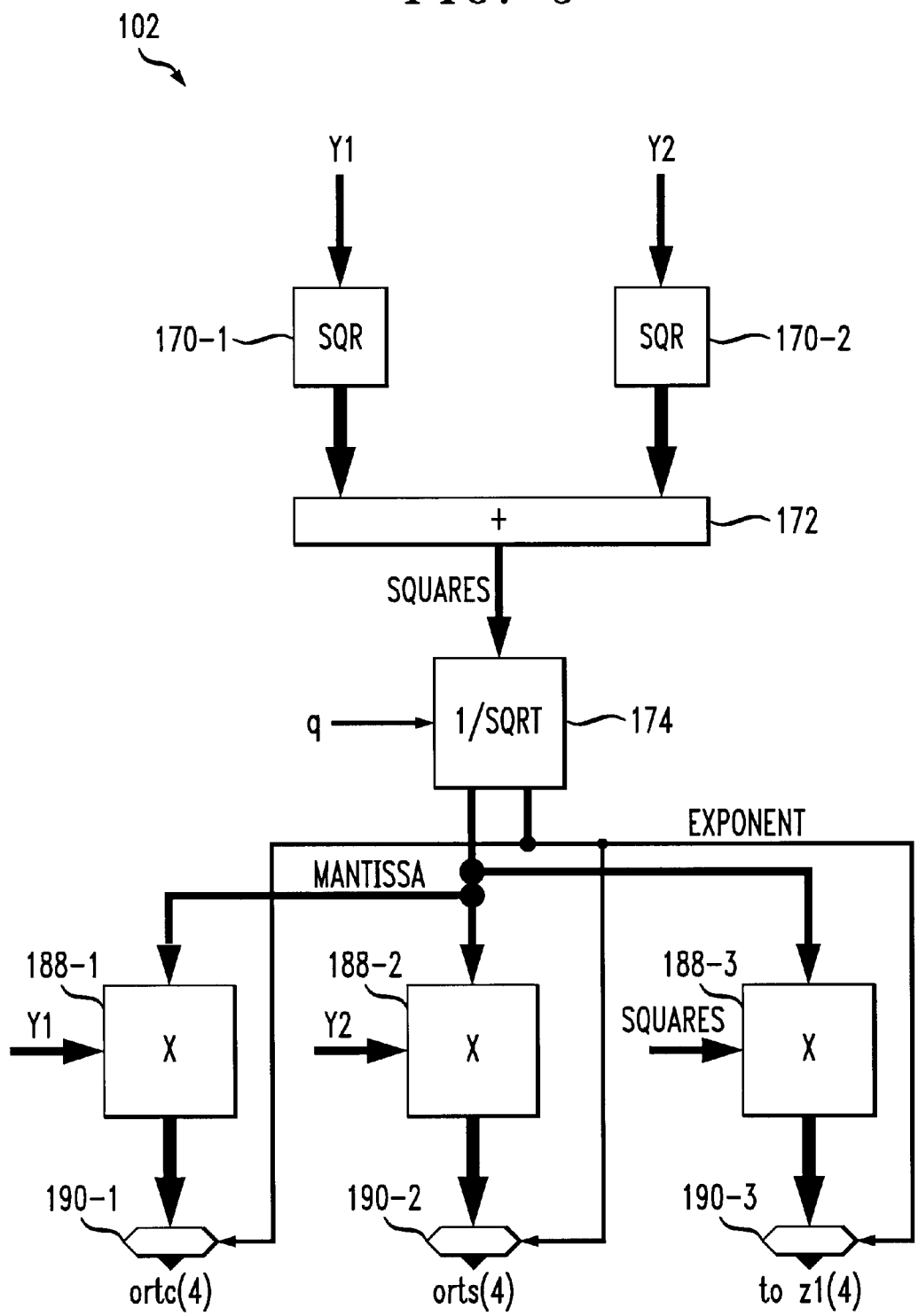
FIG. 9 illustrates a non-linear function generator suitable for use in the processor element of FIG. 7.

FIG. 9 shows an illustrative embodiment of the non-linear function generator 102. The generator 102 is used to calculate the Givens rotation as expressed in Equations (10), (11), and (12). In FIG. 9, elements shown shaded are dealing with complex numbers, and the unshaded elements are only dealing with real numbers. The generator 102 includes elements 170-1 and 170-2 that create the absolute square value of complex numbers Y1 and Y2, respectively, as the sum of the squares of the corresponding real and imaginary parts. For the Givens rotation, sum element 172 generates the sum of the outputs of the squaring elements 170-1 and 170-2 as $|a_{11}|^2+|a_{21}|^2$. This sum is input to an inverse square root generator 174. A number q is also input to the square root generator 174, to indicate where the binary point of the input sum is located. The input sum is a binary number in a "fixed point" format with all of the bits to the right of the binary point indicating the fractional part of the number, i.e., the part of the number which is less than one.

Figure 10:
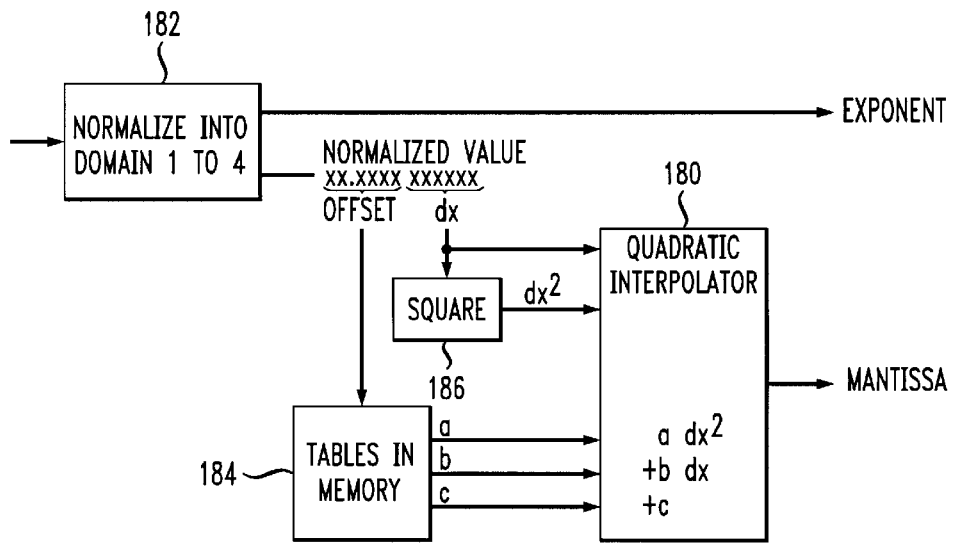
FIG. 10 shows an implementation of an inverse square root generator suitable for use in the non-linear function generator of FIG. 9.

FIG. 10 shows the inverse square root generator 174 of FIG. 9 in greater detail. In this embodiment, square root generator 174 is implemented using a quadratic interpolator 180. Normalization element 182 normalizes the number into the domain of being greater than or equal to one and less than four. A suitable technique for performing this normalization function will be described in detail below in conjunction with FIGS. 25, 26 and 27.

The output of the normalization element 182 is an unsigned normalized value in the domain one-half to one and a signed exponent that indicates how many bits the input had to be shifted to get the normalized value. As is shown in FIG. 10, a number of most significant bits of the normalized value are called the "offset" and used as an address to a memory 184 containing precomputed tables. The output of the memory 184 is three coefficients a, b, and c to be used in interpolation. The least significant bits in the normalized value to the right of the offset are called "dx." Both dx and its square as generated by element 186 are also input to the quadratic interpolator 180, which computes the output mantissa in the form of a $dx^2+b\ dx+c$.

The accuracy of the resulting mantissa is a function of the size of the memory 184. If more bits are used for the offset, then a larger memory is required, resulting in a more accurate mantissa. Table 1 shows the achievable accuracy for different table sizes. The error is given as the worst minimax relative error over the entire range. For example, a memory with 96 words of (14+17+24) bits can yield a worstcase error of $3.1$ times $10^{-7}$.

Most of the same hardware shown in FIG. 10 can be reused for the reciprocal calculation. Of course, additional memory is required to store the tables for reciprocal.

TABLE 1

Quadratic Interpolation of Inverse Square Root

| Table Size | Error in y1 | Precision of a | Precision of b | Precision of c |
|---|---|---|---|---|
| 48 | 2.4E-6 | 13 | 16 | 21 |
| 96 | 3.1E-7 | 14 | 17 | 24 |
| 192 | 3.9E-8 | 16 | 19 | 27 |
| 384 | 4.9E-9 | 15 | 22 | 30 |
| 768 | 6.2E-10 | 17 | 25 | 33 |
| 1536 | 7.6E-11 | 18 | 26 | 37 |
| 3072 | 1.0E-11 | 19 | 28 | 39 |

Referring again to FIG. 9, the non-linear function generator 102 further includes an additional set of multipliers 188-1, 188-2 and 188-3. These multipliers create the three values needed in Equations (10)–(12). Following the fixed point multiplications, corresponding barrel shifters 190-1, 190-2 and 190-3 use the exponent to denormalize the results. The output at the bottom right "to z1(4)" is coupled to the input of the multiplexer shown at the bottom of FIG. 8 and labeled "from non-linear."

The non-linear function generator 102 of FIG. 9 is shown as a single stage circuit where values would be placed and held on Y1 and Y2 inputs and eventually the three results would appear. However, in the illustrative embodiment, the circuit is preferably pipelined so that it could begin calculating a new inverse square root while several others were still being computed.

Figure 11:
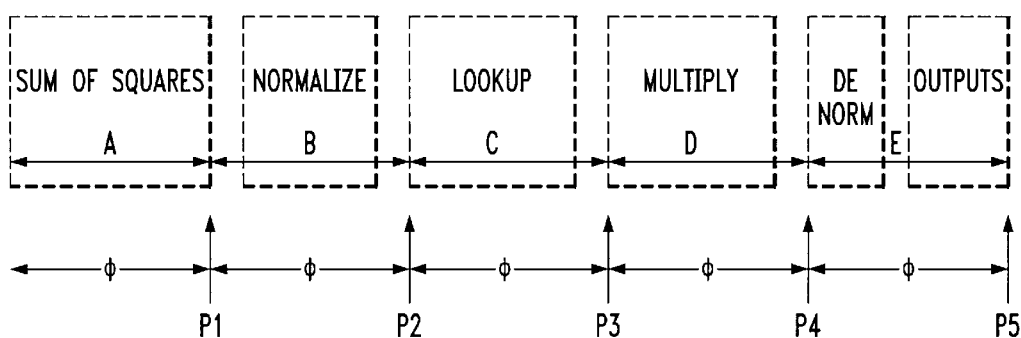
FIG. 11 illustrates a pipelined implementation of the non-linear function generator of FIG. 9.

FIG. 11 shows an example of such a pipelined implementation of the non-linear function generator 102 of FIG. 9. The generator 102 is pipelined in this implementation by placing registers at the places marked by the vertical arrows or by using more advanced techniques known by those skilled in the art, e.g., techniques such as those described in M. Heshami and B. A. Wooley, "A 250-MHZ Skewed-Clock Pipelined Data Buffer," IEEE J. Solid-State Circ., Vol. 31, No. 3, p. 376, 1996. The latency of each pipeline stage is $\phi$. Although the total latency through the entire computation is 5 $\phi$, a new computation can be begun each $\phi$. Hence, at the peak of the computation, there can be five overlapping computations of c, s, and the updated value in Equations (10)–(12) being computed simultaneously but separated in time by multiples of $\phi$.

The architecture of the register file 106 will now be described in greater detail. In order to perform certain of the desired matrix operations, it is necessary to access values stored in the register file 106 at the rate of four complex words per cycle. For example, two complex multipliers and two complex multiplicands need to be supplied to the X and Y inputs of the multiplier 150 of FIG. 8. In the PE architecture as shown in FIG. 7, two of these complex words come from port r1 of the register file 106, and the other two of these complex words come from port r2 of the register file 106. Thus a given one of these ports is designed to fetch two complex words at a time.

Figure 12:
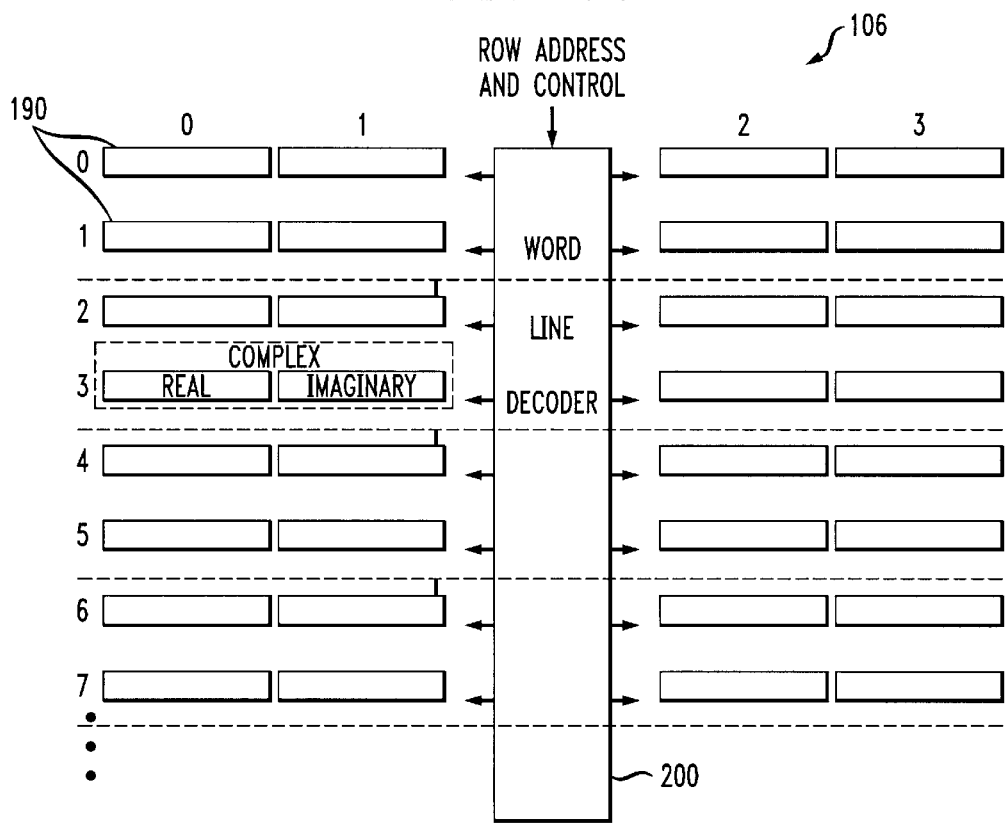
FIG. 12 shows a register file of the processor element of FIG. 7 in greater detail.

FIG. 12 shows an array of words 190 in the register file 106 of a given PE. It also shows the word line decoding for one of the three ports. The register file 106 in this embodiment is built to be four real words wide, each of the words holding a given number of bits, e.g., sixteen bits. The words reside schematically in four columns labeled zero to three. A word line decoder 200 for one port takes the row address and control information and can enable one word line on its left and one word line on its right. For the purposes described below, two rows get paired as shown by the dashed horizontal lines. The decoder 200 only needs to drive one word line on the left and one word line on the right within the same double row. The physical layout of the bits of the complex words stored in columns 0 and 1 or in columns 2 and 3 need not be as shown, but could have an order from left to right which is any desired permutation.

A given complex word generally comprises two neighboring real words, one representing the real part and one the imaginary part. In this example, every word in column 0 of FIG. 12 is the real part and every neighbor in the same row in column 1 is the associated imaginary part. Similarly, column 2 holds the real parts and column 3 the imaginary parts of other complex words.

Table 2 shows the matrix view of the elements of an eight by eight matrix. Each element is a complex number. All of the elements of two neighboring columns of the matrix will be stored in the register file 106 of a single PE. The first two columns, which will be stored in the register file of the first PE, have been shown shaded.

TABLE 2

Matrix View

| $A_{11}$ | $A_{12}$ | $A_{13}$ | $A_{14}$ | $A_{15}$ | $A_{16}$ | $A_{17}$ | $A_{18}$ |
| $A_{21}$ | $A_{22}$ | $A_{23}$ | $A_{24}$ | $A_{25}$ | $A_{26}$ | $A_{27}$ | $A_{28}$ |
| $A_{31}$ | $A_{32}$ | $A_{33}$ | $A_{34}$ | $A_{35}$ | $A_{36}$ | $A_{37}$ | $A_{38}$ |
| $A_{41}$ | $A_{42}$ | $A_{43}$ | $A_{44}$ | $A_{45}$ | $A_{46}$ | $A_{47}$ | $A_{48}$ |
| $A_{51}$ | $A_{52}$ | $A_{53}$ | $A_{54}$ | $A_{55}$ | $A_{56}$ | $A_{57}$ | $A_{58}$ |
| $A_{61}$ | $A_{62}$ | $A_{63}$ | $A_{64}$ | $A_{65}$ | $A_{66}$ | $A_{67}$ | $A_{68}$ |
| $A_{71}$ | $A_{72}$ | $A_{73}$ | $A_{74}$ | $A_{75}$ | $A_{76}$ | $A_{77}$ | $A_{78}$ |
| $A_{81}$ | $A_{82}$ | $A_{83}$ | $A_{84}$ | $A_{85}$ | $A_{86}$ | $A_{87}$ | $A_{88}$ |

Table 3 shows how the shaded elements of Table 2 get stored in the rows and columns of the register file 106 of FIG. 12. In Table 3, only the elements that derived from the first column of Table 2 have been shown shaded to indicate how the two "matrix view" columns have been stored in a shoelace pattern in the register file.

TABLE 3

Register File View of Storage of Two Complex Columns

|   | 0–1 | 2–3 |
|---|---|---|
| 0 | $A_{11}$ | $A_{12}$ |
| 1 | $A_{22}$ | $A_{21}$ |
| 2 | $A_{31}$ | $A_{32}$ |
| 3 | $A_{42}$ | $A_{41}$ |
| 4 | $A_{51}$ | $A_{52}$ |
| 5 | $A_{62}$ | $A_{61}$ |
| 6 | $A_{71}$ | $A_{72}$ |
| 7 | $A_{82}$ | $A_{81}$ |

The advantage of the storage scheme of Table 3 is that it makes it possible for each of the ports to access two complex words which are neighbors either on the same row or the same column of the "matrix view" of Table 2. As will be described below, this feature is utilized in efficient matrix-matrix multiplication on an array of PEs. Table 4 shows an alternate storage scheme for the first two rows of the register file 106 that can achieve the same result, namely access of two complex words which are either neighbors on the same "matrix view" row or column.

TABLE 4

Alternate Placement for Two Complex Words

| Register Columns | 0–1 | 2–3 |
|---|---|---|
| | $A_{11}$ | $A_{21}$ |
| | $A_{22}$ | $A_{12}$ |

Figure 13:
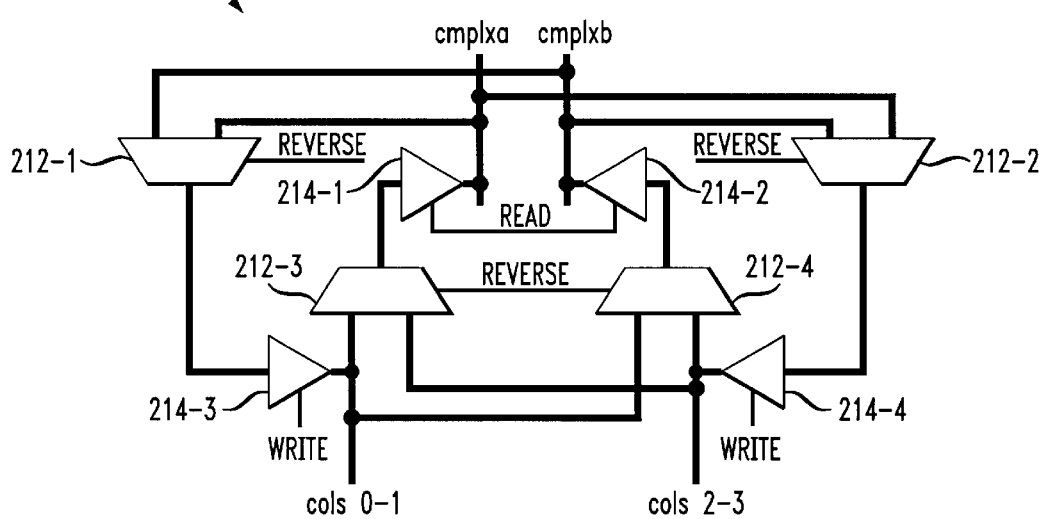
FIG. 13 shows a crossbar switch associated with a port of the register file of FIG. 12.

FIG. 13 shows a crossbar switch 210 that is associated with a given port of the register file 106. The switch includes multiplexers 212-1, 212-2, 212-3 and 212-4, and drivers 214-1, 214-2 a 214-3 and 214-4, arranged as shown. On the bottom of the figure are buses that attach to the bit lines of the columns of the register file as shown in Table 3. At the top of the figure, two complex word wide buses, named cmplxa and cmplxb, are shown. The buses cmplxa and cmplxb together comprise one of port r1 or r2 of FIG. 7.

The crossbar switch 210 performs the bi-directional interconnection of the two sets of buses at the top and the bottom of the figure with the option of reversing the order of the two complex words via a "reverse" signal applied to a control input of the multiplexers 212-1, 212-2, 212-3 and 212-4. If the "reverse" logic signal is not asserted, columns 0 and 1 will be connected to cmplxa and columns 2 and 3 will be connected to cmplxb. If "reverse" is asserted, the interconnection will be reversed. The directionality of the crossbar switch 210 is controlled by the "write" and "read" signals, only one of which may be asserted at a time. If the "write" signal is asserted, then data flows downward through the switch 210 and the contents of the register file 106 may be written through that port. If the "read" signal is asserted, then data flows upward through the switch 210 and the contents of the register file 106 may be read through that port.

The combination of the storage scheme of Table 3 and the crossbar switch 210 of FIG. 13 allows two complex words which are neighbors on either a "matrix view" row or a column to be accessed in order, enabling high performance matrix-matrix multiplication, as will be described below. Table 5 gives some examples of how the register file 106 and crossbar switch 210 can be used to access various pairs residing on the double row 2,3.

TABLE 5

Access Examples

| Complex Word Pairs | Cols 0–1 Row | Cols 2–3 Row | Reverse |
|---|---|---|---|
| $A_{31}, A_{32}$ | 2 | 2 | no |
| $A_{31}, A_{41}$ | 2 | 3 | no |
| $A_{41}, A_{42}$ | 3 | 3 | yes |
| $A_{32}, A_{42}$ | 3 | 2 | yes |

Table 6 shows possible control fields entering the register file 106 of FIG. 12 at the top of the figure. In addition to drow, a multi-bit field that indicates which double row is to be used, there is a one bit field sd, which indicates whether the access is to be a single or double complex word, a one bit field x, which if sd=single, indicates the row number and if sd=double, indicates whether the two complex words are on the same row or same column (matrix view), and a one bit field c, which indicates the column or starting column of two possible columns.

TABLE 6

Address Encodings for Register File Access Modes

| drow multi-bit | sd 1 bit | x 1 bit | c 1 bit | | |
|---|---|---|---|---|---|
| | single | row | column | single complex word | |
| | double | 0 | starting column | double complex words on a row | |
| | double | 1 | starting column | double complex words on a column | |

The present invention is particularly well suited for use in performing complex arithmetic, i.e., arithmetic involving complex numbers. However, the invention can also be used to perform arithmetic involving only real values. For example, assume that a register file such as that shown in FIG. 12 contains only real values. It will be apparent to those skilled in the art that the previously-described techniques relating to complex arithmetic can be extended in a straightforward manner to allow the access of four consecutive real values on a row or on a column. More particularly, the decoder 200 of FIG. 12 may be configured to output double the number of word lines, one to each of the words in each column. Table 7 shows how words of four columns of a real matrix could be stored in columns 0 to 3 of the register file to accomplish this.

TABLE 7

Placement for Real Matrix

| Register Columns | 0 | 1 | 2 | 3 |
|---|---|---|---|---|
| | $A_{11}$ | $A_{21}$ | $A_{31}$ | $A_{41}$ |
| | $A_{42}$ | $A_{12}$ | $A_{22}$ | $A_{32}$ |
| | $A_{33}$ | $A_{43}$ | $A_{13}$ | $A_{23}$ |
| | $A_{24}$ | $A_{34}$ | $A_{44}$ | $A_{14}$ |

A crossbar switch for supporting this real arithmetic would be larger than the switch 210 of FIG. 13. Also, in order for matrix-matrix multiplication to make full use of the register file 106 and multiplication hardware, the number of final adders at the bottom of the multiplier 150 of FIG. 8 would have to be increased to sixteen.

Linear Arrays of Processor Elements

In order to perform matrix operations with high efficiency, a number of PEs configured in the manner described above are interconnected in the form of a linear array. Different PE interconnection techniques are generally used for different types of computations, e.g., QR decomposition, back substitution, matrix inversion, matrix-matrix multiplication, and formation of covariance and cross correlation.

Figure 14:
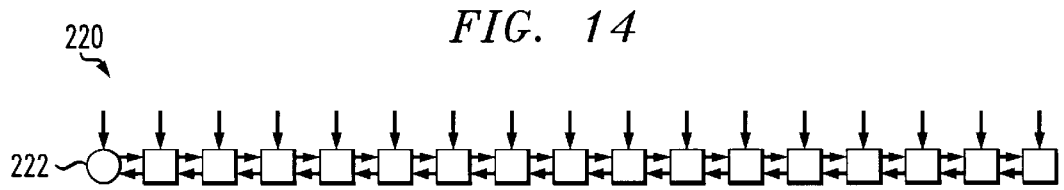
FIGS. 14 through 17 show examples of linear arrays of processor elements in accordance is with the present invention.

FIG. 14 shows a seventeen element linear array 220 of PEs comprising one head PE 222 on the left and sixteen regular PEs to its right. Each PE has bidirectional interconnections to its nearest neighbors. Each PE also has an external input from the top indicated by the downward pointing arrow that corresponds to the label "it" (for input top) of FIG. 7. This linear array configuration is suitable for performing QR decomposition on a 17×16 matrix equation and back substitution, as will be described in greater detail below.

Figure 15:
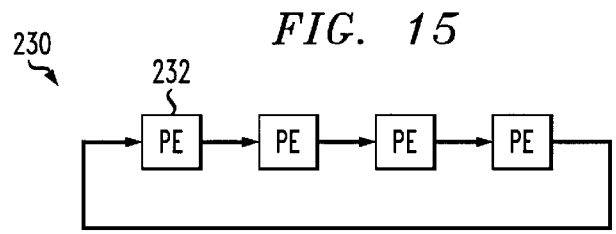

FIG. 15 shows a four element linear array 230 of PEs comprising one head PE 232 on the left and three regular PEs to its right. Clockwise circular interconnections are shown. This configuration is capable of performing matrix-matrix multiplication in a manner to be described below. In this case, the leftmost PE 232 need not include the above-described non-linear function capabilities typically associated with the head PE.

Figure 16:
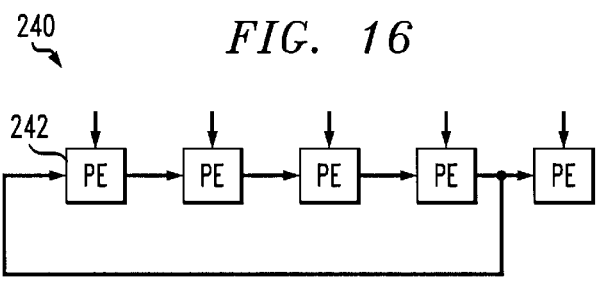

FIG. 16 shows a five element linear array 240 of PEs comprising one head PE 242 on the left and four regular PEs to its right. Clockwise circular interconnections are formed for the four leftmost PEs and one additional left to right connection from the fourth PE to the fifth. This configuration is capable of computing a covariance matrix in the leftmost four PEs and a cross correlation vector in the rightmost PE, as will be described below. Again, in this case, the leftmost PE 242 need not include the non-linear function capabilities typically associated with the head PE.

Linear arrays of PEs in accordance with the present invention, such as those shown in FIGS. 14 through 16, generally include ports, arithmetic circuitry, and register files configured to perform various operations. Array of PEs of the types shown in FIGS. 14 through 16 may be viewed as being of the class known as Multiple Instruction Multiple Data (MIMD), meaning that at any given time each PE in the array can be performing an individual operation or instruction on its own data. In order to control the functioning of the array, a program may be used. The program control may be of the class known as Very Long Instruction Word (VLIW), as described in, e.g., J. A. Fisher and B. R. Rau, "Instruction-Level Parallel Processing," Science Vol. 253, p. 1233, Sep. 13, 1991. A single long instruction word may contain individual operations to control each PE of the array.

Such VLIW instructions can be sequenced to control a linear array of processors using well-known conventional techniques. A program comprising a set of VLIW instructions would reside in a memory. For an instantiation on a single integrated circuit, a memory may be configured to have a very wide access size consisting of enough bits to hold an entire VLIW instruction in one memory word. Note that routing of the VLIW instruction from such a memory to a corresponding linear array is simpler than the routing that would be required to control a conventional two dimensional array such as that shown in FIG. 2.

As noted above, implementation of different algorithms on a linear array may require different interconnections of processor elements. For example, QR decomposition generally does not need any feedback from the rightmost element back to the head element if the number of elements in the array is equal to the dimension of the matrix plus one. Matrix-matrix multiplication generally requires a feedback connection from the last element on the right being used back to the head element. Computation of covariance and cross correlation generally requires a feedback path from the next to last element back to the head element.

Figure 17:
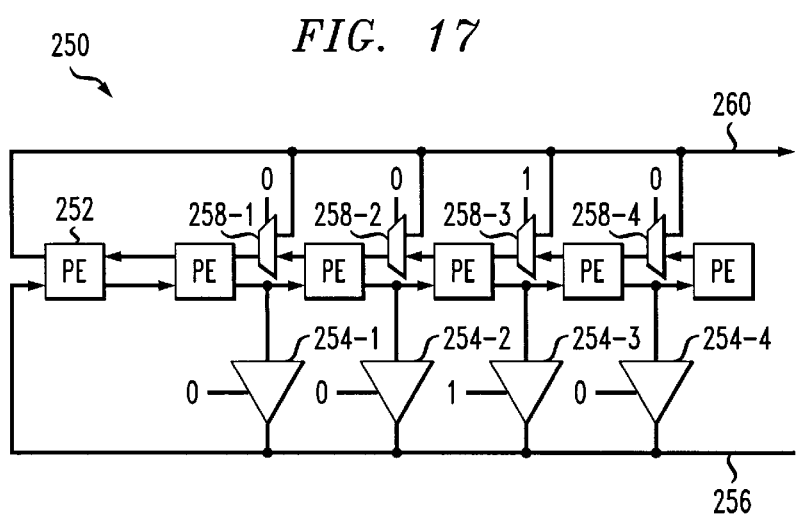

In order to allow an integrated circuit with a linear array of PEs to perform different algorithms, additional logic can be added. FIG. 17 shows a linear array 250 of five PEs with such additional circuitry added. The PE 252 represents the head PE. Tri-state gates 254-1, 254-2, 254-3 and 254-4 are shown connecting left to right bus connections to a feedback bus 256 that returns to the head PE 252. No more than one of the tri-state gates is enabled at once, all others being disabled so as not to drive the feedback bus 256. Similarly, multiplexers 258-1, 258-2, 258-3 and 258-4 are shown selecting between right to left connections and a feedback bus 260 driven by the head PE 252.

The control for the tri-state gates 254-1, 254-2, 254-3 and 254-4 and multiplexers 258-1, 258-2, 258-3 and 258-4 can be written statically into control registers at the beginning of a given algorithm in order to configure the array interconnections. This is an example of an approach known as "reconfigurable computing."

An array of PEs for performing various operations with complex matrices generally needs to interface to a larger system that provides data to the array, tells the array what computation to perform and receives results after the computation is complete. For example, the array may be interfaced to application specific logic or it may be interfaced to a host processor. The host processor itself may be a microprocessor, a digital signal processor, a workstation or any other type of digital processing device.

Figure 18:
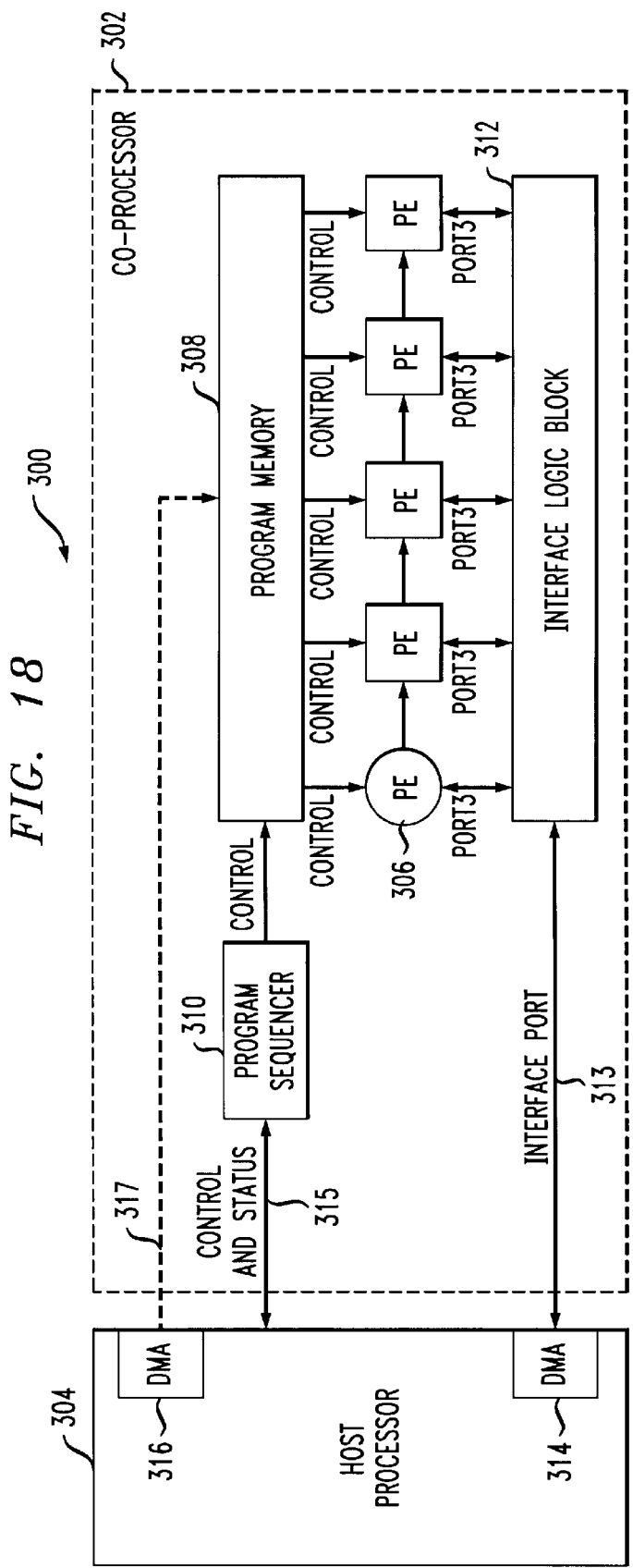
FIG. 18 illustrates an implementation of a linear array of processor elements in a co-processor which communicates with a host processor.

FIG. 18 shows an example of a processing system 300 which includes a co-processor 302 and a host processor 304. The co-processor 302 includes a linear array of five PEs including a head PE 306 and four regular,PEs. The linear array includes connections between nearest neighbors for passing data within the array in the manner previously described. A program memory 308 contains one or more programs for controlling the operation of the individual elements of the array as described above. The application of instructions to the array is controlled by a program sequencer 310 which may be of a well-known conventional type. Each PE in this example includes a register file with three ports. Two of the ports of the register file of a given PE are controlled by the instructions in the program memory, while the third port is independently controlled by an interface logic block 312. More specifically, the interface logic block 312 controls the address of port r3 for each of the PEs. The interface logic block 312 can write data to each register file or read data from each register file via port r3 of each PE.

A single interface port 313 is shown connecting the interface logic block 312 to a Direct Memory Access (DMA) port 314 of the host processor 304. The interface port 313 allows data to pass back and forth between a memory of the host processor 304 and the interface logic block 312. Another interface port 315 allows control to be passed from the host processor 304 to the program sequencer 310 to specify what data needs to be written or read. The interface logic block 312 maps data transfers to or from the host DMA port 314 to the required distributed storage in the register files of the array. An example of the mapping required is that of going from Table 2 in the host processor memory to Table 3 in the register file of a given PE. In addition, the host processor 304 can send commands to the program sequencer 310 indicating what program to execute and when to begin. The program sequencer 310 can also signal status to the host processor 304, e.g., in order to inform the host processor 304 as to when a particular program is finished executing. The host processor 304 may also communicate, via a second DMA port 316 and a connection 317, directly with the program memory 308 of the co-processor 302, e.g., in order to download different programs to the program memory 308. The connection 317 is shown in dashed outline to indicate that this connection is optional.

The co-processor 302 may be implemented, e.g., in the form of a module embedded in an Application Specific Integrated Circuit (ASIC) that performs a single fixed algorithm with its program stored in a read only program memory, as a flexible co-processor that is interfaced to a general purpose host computer and can be dynamically loaded with different programs to execute, or in numerous other configurations. In the embedded ASIC application, it may be more convenient for data to enter and exit the array directly via ports on each PE rather than through port r3 of the register file as illustrated in FIG. 18.

The operation of a linear array of processor elements in accordance with the invention will now be described in greater detail, for the examples of QR decomposition, back substitution, matrix inversion, matrix-matrix multiplication, and formation of covariance and cross correlation.

QR Decomposition

As previously noted, QR decomposition is achieved in the prior art using a two dimensional triangular systolic array. In this section, it will be described how the same algorithm can be performed on a linear array of the present invention as illustrated in FIG. 14, with substantially less hardware and nearly the same performance.

Figures 1, 2:
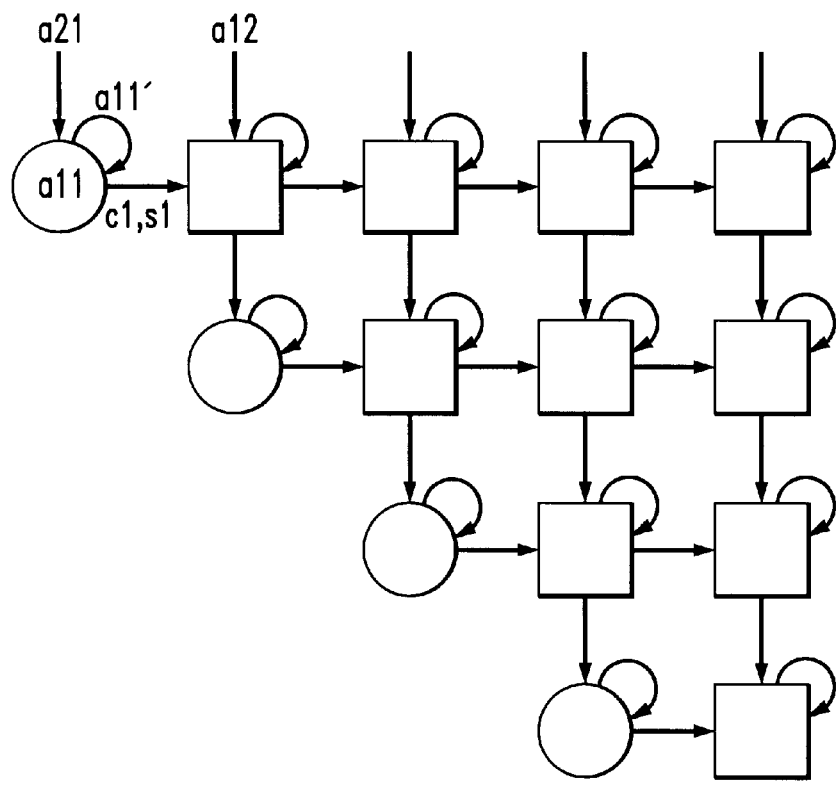
FIG. 1 shows the stages of a set of Givens rotations for a QR decomposition example.
FIGS. 2 through 5 illustrate the manner in which the Givens rotations of the FIG. 1 example are implemented in a conventional two dimensional triangular array of processor elements.
Figure 3:
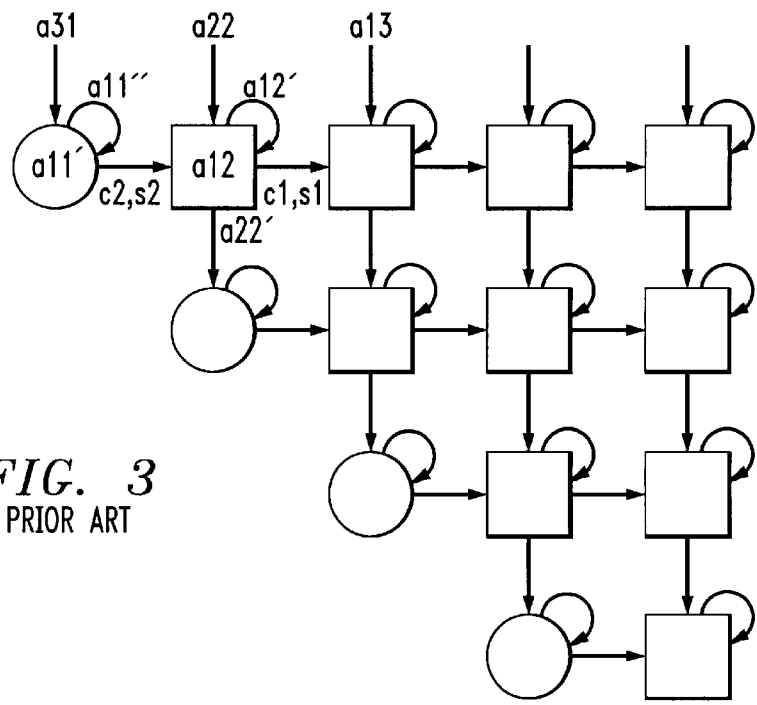
Figure 4:
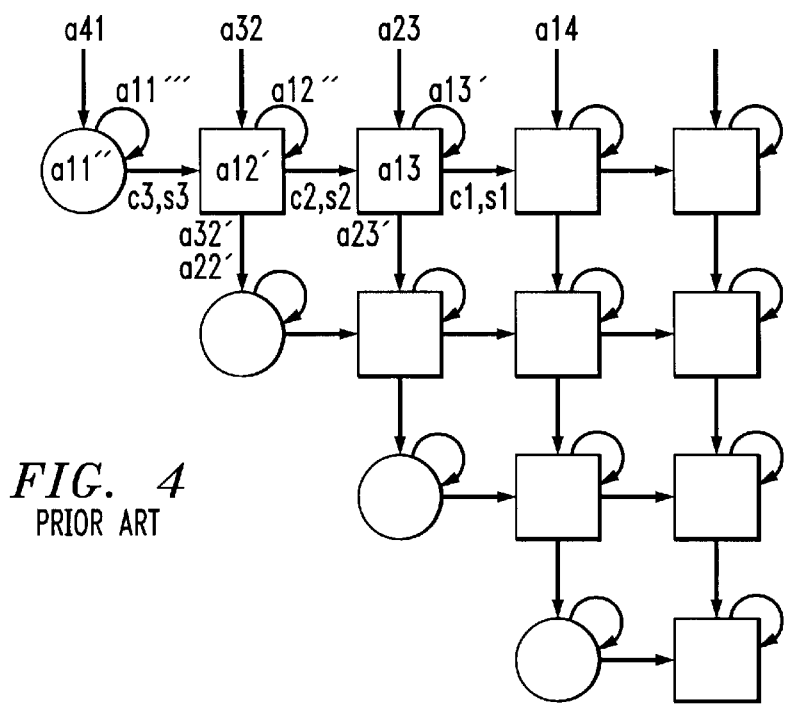
Figure 5:
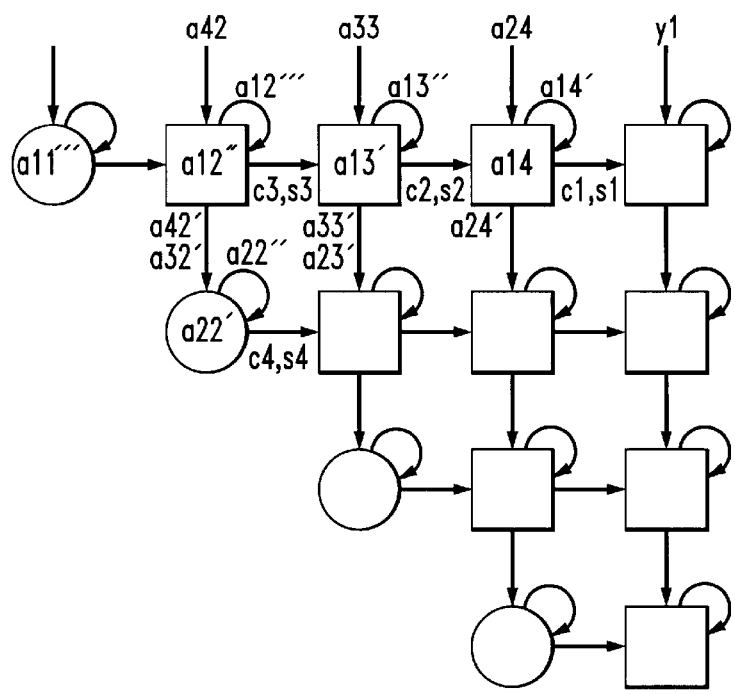
Figure 6:
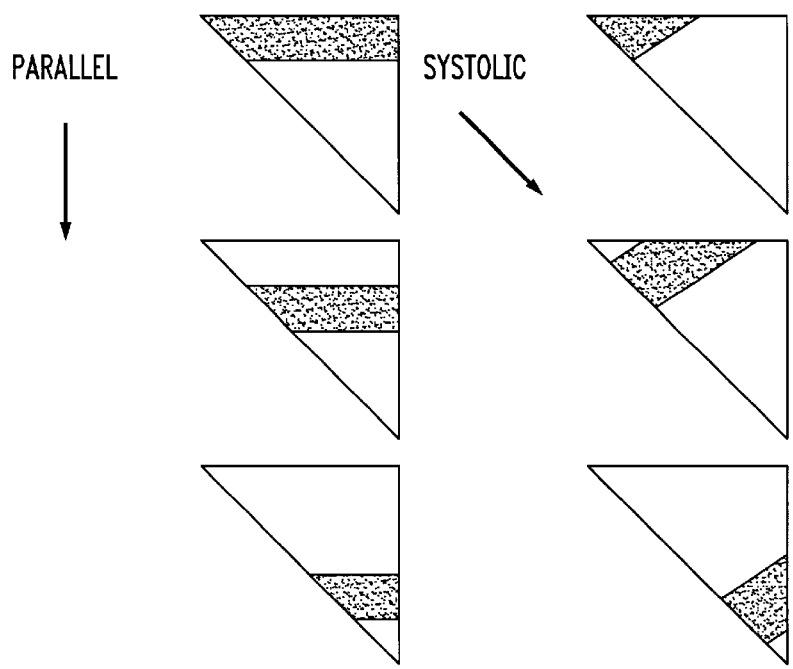
FIG. 6 compares conventional parallel and systolic processing approaches as implemented on a two dimensional triangular array of processor elements.

The mapping of interconnections from those shown in FIG. 2 to those of FIG. 14 will first be described. A virtual two dimensional triangular array may be mapped to a physical one dimensional linear array as follows. Each round head PE of the triangular array is mapped to the single head PE of the linear array. Each square regular PE of the triangular array immediately to the right of a round PE is mapped to the regular PE of the linear array immediately to the right of the round PE. This pattern continues. The interconnections between the PEs of the FIG. 14 linear array 220 are bidirectional. When an element of the two dimensional triangular array would pass data down to the next row, this is mapped in the linear array to passing the data to the left. In this manner, the entire computation done on the two dimensional triangular array can be mapped to the linear array with the one exception that instead of the true parallelism possible in the two dimensional case, the linear array must skew the computation by a phase 4 every time the computation begins on a new column of the matrix. This has the effect of lengthening the total latency of the QR decomposition slightly, as will be described in more detail below.

In this example, the only use that is made of the register file of FIG. 7 is to write results as they are generated. The results are left in the register file and will not be shown as being read back by the program.

TABLE 8

Instruction Mnemonics

| Instruction Mnemonic | Round Element | Square Element | Description |
|---|---|---|---|
| csrg | y | | compute 'c' and 's', inputs from 'r'ight and 'g1' register |
| csrv | y | | compute 'c' and 's', inputs from 'r'ight and last 'v'alue |
| cstg | y | | compute 'c' and 's', inputs from 't'op and 'g1' register |
| cstv | y | | compute 'c' and 's', inputs from 't'op and last 'v'alue |
| ldrt | y | y | 'l'oa'd' g1 register from 'r'igh't' |
| ldrw | y | y | ldrt and rgvw |
| ldtp | y | y | 'l'oa'd' g1 register from 't'o'p' |
| rgrw | y | y | 'r'e'g'ister file from 'r'ight 'w'rite |
| rgvw | y | y | 'r'e'g'ister file from last 'v'alue 'w'rite |
| rorg | y | y | 'ro'tate, inputs from 'r'ight and 'g1' register |
| rorv | y | y | 'ro'tate, inputs from 'r'ight and last 'v'alue |

TABLE 8-continued

Instruction Mnemonics

| Instruction Mnemonic | Round Element | Square Element | Description |
|---|---|---|---|
| rotg | y | y | 'ro'tate, inputs from 't'op and 'g1' register |
| rotv | y | y | 'ro'tate, inputs from 't'op and last 'v'alue |

Table 8 shows a possible instruction set for the PEs of the linear array 220 of FIG. 14. The mnemonics are given in the first column. A 'y' in the second or third columns indicates that the mnemonic is applicable to the round or square PE respectively. The fourth column gives a description of what the instruction performs. As implied by the description, it is assumed that there is a 'g1' register at the input of each PE that can be loaded either from the top or from the right.

Table 9 shows a program for performing QR decomposition utilizing the instructions shown in Table 8. The numbers following the mnemonics, such as the 2 in "cstv2," are ignored by the processor element and are only present in the source code to help understand the program. If an entry is blank, that indicates that a "noop" instruction is to be executed. The "noop" does not start a new computation. However, it continues the pipeline for any previous computations in progress. The top row indicates the meaning of the columns. The first column gives a count of the elapsed time measured in steps and substeps. A substep occupies one row of the table and takes an amount of time $\phi$ referred to above in the description of the pipeline. The latency for the completion of an instruction is 5 $\phi$ in this example and equals one step. The second through the eighteenth columns correspond to instructions controlling the seventeen processor elements of FIG. 14.

A single row of the table with seventeen instructions may be considered a VLIW. Methods for sequencing VLIW instructions to control a linear array of processor elements are well known to those skilled in the art.

Note that near the beginning of the program of Table 9, instructions may only be started on the first substep of each step because the next instruction needs the result of the previous instruction and the latency is one step. However, when substep two of step four is reached, there have already been two zeroes placed and the program can begin the computation of two "c"s and "s"s following each other in the pipeline. If the computation were being done on a two dimensional triangular array of processor elements, "cstv4" and "csrg16" could be performed simultaneously. In the case of the current invention, these operations are not completely simultaneous, but are instead skewed by one substep $\phi$. This is the minor price that is paid for the considerable reduction in the number of PEs needed in going from a conventional two dimensional triangular array to a one dimensional linear array in accordance with the present invention. As the program progresses, one can see that more and more pipeline slots are utilized. By step thirteen, the pipeline is filled with five computations of "c"s and "s"s. By the end of the program, the pipeline can no longer be filled. The last row of Table 9 gives the percent utilization of each processor element.

TABLE 9

17 x 16 QR Decomposition on Pipelined Linear Array

| step md | sqr2 | sqr3 | sqr4 | sqr5 | sqr6 | sqr7 | sqr8 | sqr9 | sqr10 | sqr11 | sqr12 | sqr13 | sqr14 | sqr15 | sqr16 | sqr17 |
|---|---|---|---|---|---|---|---|---|---|---|---|---|---|---|---|---|
| 0/1 ldtp | | | | | | | | | | | | | | | | |
| /2 | | | | | | | | | | | | | | | | |
| /3 | | | | | | | | | | | | | | | | |
| /4 | | | | | | | | | | | | | | | | |
| /5 | | | | | | | | | | | | | | | | |
| 1/1 cstg1 | ldtp | | | | | | | | | | | | | | | |
| /2 | | | | | | | | | | | | | | | | |
| /3 | | | | | | | | | | | | | | | | |
| /4 | | | | | | | | | | | | | | | | |
| /5 | | | | | | | | | | | | | | | | |
| 2/1 cstv2 | rotg1 | ldtp | | | | | | | | | | | | | | |
| /2 | | | | | | | | | | | | | | | | |
| /3 | | | | | | | | | | | | | | | | |
| /4 | | | | | | | | | | | | | | | | |
| /5 | | | | | | | | | | | | | | | | |
| 3/1 cstv3 | rotv2 | rotg1 | ldtp | | | | | | | | | | | | | |
| /2 ldrt | | | | | | | | | | | | | | | | |
| /3 | | | | | | | | | | | | | | | | |
| /4 | | | | | | | | | | | | | | | | |
| /5 | | | | | | | | | | | | | | | | |
| 4/1 cstv4 | rotv3 | rotv2 | rotg1 | ldtp | | | | | | | | | | | | |
| /2 csrg16 | ldrt | | | | | | | | | | | | | | | |
| /3 | | | | | | | | | | | | | | | | |
| /4 | | | | | | | | | | | | | | | | |
| /5 | | | | | | | | | | | | | | | | |
| 5/1 cstv5 | rotv4 | rotv3 | rotv2 | rotg1 | ldtp | | | | | | | | | | | |
| /2 csrv17 | rorg16 | ldrt | | | | | | | | | | | | | | |
| /3 | | | | | | | | | | | | | | | | |
| /4 | | | | | | | | | | | | | | | | |
| /5 | | | | | | | | | | | | | | | | |
| 6/1 cstv6 | rotv5 | rotv4 | rotv3 | rotv2 | rotg1 | ldtp | | | | | | | | | | |
| /2 csrv18 | rorv17 | rorg16 | ldrt | | | | | | | | | | | | | |
| /3 ldrt | | | | | | | | | | | | | | | | |
| /4 | | | | | | | | | | | | | | | | |
| /5 | | | | | | | | | | | | | | | | |
| 7/1 cstv7 | rotv6 | rotv5 | rotv4 | rotv3 | rotv2 | rotg1 | ldtp | | | | | | | | | |
| /2 csrv19 | rorv18 | rorv17 | rorg16 | ldrt | | | | | | | | | | | | |
| /3 csrg30 | ldrt | | | | | | | | | | | | | | | |
| /4 | | | | | | | | | | | | | | | | |
| /5 | | | | | | | | | | | | | | | | |
| 8/1 cstv8 | rotv7 | rotv6 | rotv5 | rotv4 | rotv3 | rotv2 | rotg1 | ldtp | | | | | | | | |
| /2 csrv20 | rorv19 | rorv18 | rorv17 | rorg16 | ldrt | | | | | | | | | | | |
| /3 csrv31 | rorg30 | ldrt | | | | | | | | | | | | | | |
| /4 | | | | | | | | | | | | | | | | |
| /5 | | | | | | | | | | | | | | | | |

TABLE 9-continued

17 × 16 QR Decomposition on Pipelined Linear Array

| step | md | sqr2 | sqr3 | sqr4 | sqr5 | sqr6 | sqr7 | sqr8 | sqr9 | sqr10 | sqr11 | sqr12 | sqr13 | sqr14 | sqr15 | sqr16 | sqr17 |
|---|---|---|---|---|---|---|---|---|---|---|---|---|---|---|---|---|---|
| 9/1 | cstv9 | rotv8 | rotv7 | rotv6 | rotv5 | rotv4 | rotv3 | rotv2 | rotg1 | ldtp | | | | | | | |
| /2 | csrv21 | rorv20 | rorv19 | rorv18 | rorv17 | rorg16 | ldrt | | | | | | | | | | |
| /3 | csrv32 | rorv31 | rorg30 | ldrt | | | | | | | | | | | | | |
| /4 | csrg43 | ldrt | | | | | | | | | | | | | | | |
| /5 | | | | | | | | | | | | | | | | | |
| 10/1 | cstv10 | rotv9 | rotv8 | rotv7 | rotv6 | rotv5 | rotv4 | rotv3 | rotv2 | rotg1 | ldtp | | | | | | |
| /2 | csrv22 | rorv21 | rorv20 | rorv19 | rorv18 | rorv17 | rorg16 | ldrt | | | | | | | | | |
| /3 | csrv33 | rorv32 | rorv31 | rorg30 | ldrt | | | | | | | | | | | | |
| /4 | csrg43 | ldrt | | | | | | | | | | | | | | | |
| /5 | | | | | | | | | | | | | | | | | |
| 11/1 | cstv11 | rotv10 | rotv9 | rotv8 | rotv7 | rotv6 | rotv5 | rotv4 | rotv3 | rotv2 | rotg1 | ldtp | | | | | |
| /2 | csrv23 | rorv22 | rorv21 | rorv20 | rorv19 | rorv18 | rorv17 | rorg16 | ldrt | | | | | | | | |
| /3 | csrv34 | rorv33 | rorv32 | rorv31 | rorg30 | ldrt | | | | | | | | | | | |
| /4 | csrv44 | rorg43 | ldrt | | | | | | | | | | | | | | |
| /5 | | | | | | | | | | | | | | | | | |
| 12/1 | cstv12 | rotv11 | rotv10 | rotv9 | rotv8 | rotv7 | rotv6 | rotv5 | rotv4 | rotv3 | rotv2 | rotg1 | ldtp | | | | |
| /2 | csrv24 | rorv23 | rorv22 | rorv21 | rorv20 | rorv19 | rorv18 | rorv17 | rorg16 | ldrt | | | | | | | |
| /3 | csrv35 | rorv34 | rorv33 | rorv32 | rorv31 | rorg30 | ldrt | | | | | | | | | | |
| /4 | csrv45 | rorv44 | rorg43 | ldrt | | | | | | | | | | | | | |
| /5 | ldrt | | | | | | | | | | | | | | | | |
| 13/1 | cstv13 | rotv12 | rotv11 | rotv10 | rotv9 | rotv8 | rotv7 | rotv6 | rotv5 | rotv4 | rotv3 | rotv2 | rotg1 | ldtp | | | |
| /2 | csrv25 | rorv24 | rorv23 | rorv22 | rorv21 | rorv20 | rorv19 | rorv18 | rorv17 | rorg16 | ldrt | | | | | | |
| /3 | csrv36 | rorv35 | rorv34 | rorv33 | rorv32 | rorv31 | rorg30 | ldrt | | | | | | | | | |
| /4 | csrv46 | rorv45 | rorv44 | rorg43 | ldrt | | | | | | | | | | | | |
| /5 | csrv56 | rorg55 | ldrt | | | | | | | | | | | | | | |
| 14/1 | cstv14 | rotv13 | rotv12 | rotv11 | rotv10 | rotv9 | rotv8 | rotv7 | rotv6 | rotv5 | rotv4 | rotv3 | rotv2 | rotg1 | ldtp | | |
| /2 | csrv26 | rorv25 | rorv24 | rorv23 | rorv22 | rorv21 | rorv20 | rorv19 | rorv18 | rorv17 | rorg16 | ldrt | | | | | |
| /3 | csrv36 | rorv36 | rorv35 | rorv34 | rorv33 | rorv32 | rorv31 | rorg30 | ldrt | | | | | | | | |
| /4 | csrv47 | rorv46 | rorv45 | rorv44 | rorg43 | ldrt | | | | | | | | | | | |
| /5 | csrv56 | rorv57 | rorv56 | ldrt | | | | | | | | | | | | | |
| 15/1 | cstv15 | rotv14 | rotv13 | rotv12 | rotv11 | rotv10 | rotv9 | rotv8 | rotv7 | rotv6 | rotv5 | rotv4 | rotv3 | rotv2 | rotg1 | ldtp | |
| /2 | csrv27 | rorv26 | rorv25 | rorv25 | rorv23 | rorv22 | rorv21 | rorv20 | rorv19 | rorv18 | rorv17 | rorg16 | ldrt | | | | |
| /3 | csrv38 | rorv37 | rorv36 | rorv36 | rorv34 | rorv33 | rorv32 | rorv31 | rorg30 | ldrt | | | | | | | |
| /4 | csrv48 | rorv47 | rorv46 | rorv45 | rorv44 | rorg43 | ldrt | | | | | | | | | | |
| /5 | csrv57 | rorv56 | rorg55 | ldrt | | | | | | | | | | | | | |
| 16/1 | ldrw0 | ldrw0 | rotv14 | rotv13 | rotv12 | rotv11 | rotv10 | rotv9 | rotv8 | rotv7 | rotv6 | rotv5 | rotv4 | rotv3 | rotv2 | rotg1 | ldtp |
| /2 | csrv28 | rorv27 | rorv26 | rorv25 | rorv24 | rorv23 | rorv22 | rorv21 | rorv20 | rorv19 | rorv18 | rorv17 | rorg16 | ldrt | | | |
| /3 | csrv39 | rorv38 | rorv37 | rorv36 | rorv35 | rorv34 | rorv33 | rorv32 | rorv31 | rorg30 | ldrt | | | | | | |
| /4 | csrv49 | rorv48 | rorv47 | rorv46 | rorv45 | rorv44 | rorg43 | ldrt | | | | | | | | | |
| /5 | csrv58 | rorv57 | rorv56 | rorg55 | ldrt | | | | | | | | | | | | |
| 17/1 | csrg66 | ldrw0 | rotv15 | rotv14 | rotv13 | rotv12 | rotv11 | rotv10 | rotv9 | rotv8 | rotv7 | rotv6 | rotv5 | rotv4 | rotv3 | rotv2 | rotg1 |
| /2 | csrv29 | rorv28 | rorv27 | rorv26 | rorv25 | rorv24 | rorv23 | rorv22 | rorv21 | rorv20 | rorv19 | rorv18 | rorv17 | rorv16 | ldrt | | |
| /3 | csrv40 | rorv39 | rorv38 | rorv37 | rorv36 | rorv35 | rorv34 | rorv33 | rorv32 | rorv31 | rorg30 | ldrt | | | | | |
| /4 | csrv50 | rorv49 | rorv48 | rorv47 | rorv46 | rorv45 | rorv44 | rorg43 | ldrt | | | | | | | | |
| /5 | csrv59 | rorv58 | rorv57 | rorg55 | ldrt | | | | | | | | | | | | |
| 18/1 | csrg67 | rorg66 | ldrw0 | rotv15 | rotv14 | rotv13 | rotv12 | rotv11 | rotv10 | rotv9 | rotv8 | rotv7 | rotv6 | rotv5 | rotv4 | rotv3 | rotv2 |
| /2 | rgvw1 | rorv29 | rorv28 | rorv27 | rorv26 | rorv25 | rorv24 | rorv23 | rorv22 | rorv21 | rorv20 | rorv19 | rorv18 | rorv17 | rorv16 | ldrt | |
| /3 | csrv41 | rorv40 | rorv39 | rorv38 | rorv37 | rorv36 | rorv35 | rorv34 | rorv33 | rorv32 | rorv31 | rorg30 | ldrt | | | | |

TABLE 9-continued

17 × 16 QR Decomposition on Pipelined Linear Array

| step | md | sqr2 | sqr3 | sqr4 | sqr5 | sqr6 | sqr7 | sqr8 | sqr9 | sqr10 | sqr11 | sqr12 | sqr13 | sqr14 | sqr15 | sqr16 | sqr17 |
|---|---|---|---|---|---|---|---|---|---|---|---|---|---|---|---|---|---|
| | /4 | csrv51 | rorv50 | rorv49 | rorv48 | rorv47 | rorv46 | rorv45 | rorv44 | rorg43 | ldrt | | | | | | | |
| | /5 | csrv60 | rorv59 | rorv58 | rorv57 | rorv56 | rorg55 | ldrt | | | | | | | | | | |
| 19/1 | csrv68 | rorv67 | rorg66 | ldrw0 | rotv14 | rotv14 | rotv13 | rotv12 | rotv11 | rotv10 | rotv9 | rotv8 | rotv7 | rotv6 | rotv5 | rotv4 | rotv3 |
| | /2 | ldrt | rgvw1 | rorv28 | rorv27 | rorv26 | rorv25 | rorv24 | rorv23 | rorv22 | rorv21 | rorv20 | rorv19 | rorv18 | rorv17 | rorg16 | |
| | /3 | csrv42 | rorv41 | rorv40 | rorv39 | rorv38 | rorv37 | rorv36 | rorv35 | rorv34 | rorv33 | rorv32 | rorv31 | ldrt | | | | |
| | /4 | csrv52 | rorv51 | rorv50 | rorv49 | rorv48 | rorv47 | rorv46 | rorv45 | rorv44 | rorg43 | ldrt | | | | | | |
| | /5 | csrv61 | rorv60 | rorv59 | rorv58 | rorv57 | rorv56 | rorg55 | ldrt | | | | | | | | | |
| 20/1 | csrv69 | rorv68 | rorv67 | rorg66 | ldrw0 | rotv15 | rotv14 | rotv13 | rotv12 | rotv11 | rotv10 | rotv9 | rotv8 | rotv7 | rotv6 | rotv5 | rotv4 |
| | /2 | csrg76 | ldrt | rgvw1 | rorv29 | rorv28 | rorv27 | rorv26 | rorv25 | rorv24 | rorv23 | rorv22 | rorv21 | rorv20 | rorv19 | rorv18 | rorv17 | |
| | /3 | rgvw2 | rorv42 | rorv41 | rorv40 | rorv39 | rorv38 | rorv37 | rorv36 | rorv35 | rorv34 | rorv33 | rorv32 | rorv31 | rorg30 | ldrt | | |
| | /4 | csrv53 | rorv52 | rorv51 | rorv50 | rorv49 | rorv48 | rorv47 | rorv46 | rorv45 | rorv44 | rorv43 | ldrt | | | | | |
| | /5 | csrv62 | rorv61 | rorv60 | rorv59 | rorv58 | rorv57 | rorv56 | rorg55 | ldrt | | | | | | | | |
| 21/1 | csrv70 | rorv69 | rorv68 | rorv67 | ldrw0 | rotv15 | rotv14 | rotv13 | rotv12 | rotv11 | rotv10 | rotv9 | rotv8 | rotv7 | rotv6 | rotv5 | |
| | /2 | csrv77 | rorg76 | ldrt | rgvw1 | rorv29 | rorv28 | rorv27 | rorv26 | rorv25 | rorv24 | rorv23 | rorv22 | rorv21 | rorv20 | rorv19 | rorv18 | |
| | /3 | | rgvw2 | rorv42 | rorv41 | rorv40 | rorv39 | rorv38 | rorv37 | rorv36 | rorv35 | rorv34 | rorv33 | rorv32 | rorv31 | rorg30 | ldrt | |
| | /4 | rgvw3 | rorv54 | rorv53 | rorv52 | rorv51 | rorv50 | rorv49 | rorv48 | rorv47 | rorv46 | rorv45 | ldrt | | | | | |
| | /5 | csrv64 | rorv63 | rorv62 | rorv61 | rorv60 | rorv59 | rorv58 | rorv57 | rorg56 | rorg55 | ldrt | | | | | | |
| 22/1 | csrv71 | rorv70 | rorv69 | rorv68 | rorv67 | ldrw0 | rotv15 | rotv14 | rotv13 | rotv12 | rotv11 | rotv10 | rotv9 | rotv8 | rotv7 | rotv6 | |
| | /2 | csrv78 | rorv77 | rorg76 | ldrt | rgvw1 | rorv29 | rorv28 | rorv27 | rorv26 | rorv25 | rorv24 | rorv23 | rorv22 | rorv21 | rorv20 | rorv19 | |
| | /3 | ldrt | | rgvw2 | rorv42 | rorv41 | rorv40 | rorv39 | rorv38 | rorv37 | rorv36 | rorv35 | rorv34 | rorv33 | rorv32 | rorv31 | | |
| | /4 | rgvw3 | rorv54 | rorv53 | rorv52 | rorv51 | rorv50 | rorv49 | rorv48 | rorv47 | rorv46 | rorv45 | ldrt | | | | | |
| | /5 | csrv64 | rorv63 | rorv62 | rorv61 | rorv60 | rorv59 | rorv58 | rorv57 | rorv56 | rorg55 | ldrt | | | | | | |
| 23/1 | csrv72 | rorv71 | rorv70 | rorv69 | rorv68 | ldrt | ldrw0 | rotv15 | rotv14 | rotv13 | rotv12 | rotv11 | rotv10 | rotv9 | rotv8 | rotv7 | |
| | /2 | csrv79 | rorv78 | rorv77 | | ldrt | rgvw1 | rorv29 | rorv28 | rorv27 | rorv26 | rorv25 | rorv24 | rorv23 | rorv22 | rorv21 | rorv20 | |
| | /3 | csrg85 | rorg85 | rgvw2 | rorv53 | rorv52 | rorv51 | rorv50 | rorv49 | rorv48 | rorv47 | rorv46 | rorv45 | rorv44 | rorv43 | | | |
| | /4 | ldrt | | | | ldrt | | ldrw0 | rorv41 | rorv40 | rorv39 | rorv38 | rorv37 | rorv36 | rorv35 | rorv34 | rorv33 | |
| | /5 | csrv65 | rorv64 | rorv63 | rorv62 | rorv61 | rorv60 | rorv59 | rorv58 | rorv57 | rorv56 | rorv55 | ldrt | | | | | |
| 24/1 | csrv73 | rorv72 | rorv71 | rorv70 | rorv69 | rorv68 | rorv67 | ldrw0 | rotv15 | rotv14 | rotv13 | rotv12 | rotv11 | rotv10 | rotv9 | rotv8 | |
| | /2 | csrv80 | rorv79 | rorv78 | rorv77 | ldrt | rgvw1 | rorv41 | rorv29 | rorv28 | rorv27 | rorv26 | rorv25 | rorv24 | rorv23 | rorv22 | rorv21 | |
| | /3 | csrv86 | rorg85 | ldrt | | rorv42 | rorv42 | rorv41 | rorv40 | rorv39 | rorv38 | rorv37 | rorv36 | rorv35 | rorv34 | | | |
| | /4 | | | rgvw3 | rorv54 | rorv53 | rorv52 | rorv51 | rorv50 | rorv49 | rorv48 | rorv47 | rorv46 | rorv45 | rorv44 | | | |
| | /5 | csrv65 | rorv64 | rorv63 | rorv62 | rorv61 | rorv60 | rorv59 | rorv58 | rorv57 | rorv56 | ldrt | | | | | | |
| 25/1 | csrv74 | rorv73 | rorv72 | rorv71 | rorv70 | rorv69 | rorv68 | ldrt | rotv14 | rotv14 | rotv13 | rotv14 | rotv13 | rotv12 | rotv11 | rotv10 | rotv9 |
| | /2 | csrv81 | rorv80 | rorv79 | rorv78 | rorg76 | ldrt | rgvw1 | rgvw1 | rorv29 | rorv28 | rorv27 | rorv26 | rorv25 | rorv24 | rorv23 | rorv22 | |
| | /3 | csrv87 | rorv86 | rorv86 | ldrt | | rgvw2 | rorv52 | rorv51 | rorv40 | rorv39 | rorv38 | rorv37 | rorv36 | rorv35 | rorv34 | rorv23 | |
| | /4 | ldrt | rorg93 | rorg85 | rgvw3 | rgvw3 | rgvw3 | rorv53 | rorv42 | rorv42 | rorv41 | rorv40 | rorv39 | rorv38 | rorv37 | rorv36 | | |
| | /5 | | | rgvw4 | rorv64 | rorv54 | rorv54 | rorv54 | rorv54 | | ldrt | | | | | | | |
| 26/1 | rgvw4 | rorv74 | rorv73 | rorv72 | rorv71 | rorv70 | rorv69 | rorv68 | rotv15 | rotv14 | rotv14 | rotv15 | rotv14 | rotv13 | rotv12 | rotv11 | rotv10 |
| | /2 | csrv82 | rorv82 | rorv81 | rorv80 | rorv79 | rorv78 | rorv77 | rorg76 | rorg66 | rorg66 | ldrw0 | ldrw0 | rorv15 | rorv14 | rorv13 | rorv12 | |
| | /3 | csrv88 | rorv88 | rorv87 | rorv86 | rorv78 | rorv78 | rorg76 | ldrt | ldrt | rgvw1 | rorv29 | rorv28 | rorv27 | rorv26 | rorv25 | rorv24 | |
| | /4 | csrg93 | rorg93 | rorg85 | ldrt | | | rgvw2 | rgvw2 | rorv42 | rorv41 | rorv40 | rorv39 | rorv38 | rorv37 | rorv36 | | |
| | /5 | | | ldrt | | | | | | | | | | | | | | |
| 27/1 | rgvw5 | rorv75 | rorv74 | rorv73 | rorv72 | rorv71 | rorv70 | rorv69 | rorv68 | rorv67 | rorg66 | ldrw0 | rotv15 | rotv14 | rotv13 | rotv12 | |
| | /2 | rgvw3 | rorv82 | rorv81 | rorv80 | rorv79 | rorv78 | rorg76 | ldrt | ldrt | rgvw1 | rorv29 | rorv28 | rorv27 | rorv26 | rorv25 | rotv11 | |
| | /3 | csrv89 | rorv89 | rorv88 | rorv87 | rorv86 | rorg78 | rorg76 | rorv77 | rorv41 | rorv41 | rorv40 | rorv39 | rorv38 | rorv37 | rorv26 | rotv25 | |
| | /4 | csrv94 | rorg93 | ldrt | rorv86 | ldrt | | | | ldrt | | rorv41 | rorv41 | rorv40 | rorv39 | rorv38 | | |
| | /5 | | | | | rgvw4 | rorv65 | rorv64 | rorv63 | rorv62 | rorv61 | rgvw2 | rorv52 | rorv52 | | | | |

TABLE 9-continued 17 x 16 QR Decomposition on Pipelined Linear Array

| step | md | sqr2 | sqr3 | sqr4 | sqr5 | sqr6 | sqr7 | sqr8 | sqr9 | sqr10 | sqr11 | sqr12 | sqr13 | sqr14 | sqr15 | sqr16 | sqr17 |
|---|---|---|---|---|---|---|---|---|---|---|---|---|---|---|---|---|---|
| 28/1 |  | rgvw5 | rorv75 | rorv74 | rorv73 | rorv72 | rorv71 | rorv70 | rorv69 | rorv68 | rorv67 | rorg66 | rgvw0 | rorv15 | rorv14 | rorv13 | sqr17 |
| /2 | csrv84 | rorv83 | rorv82 | rorv81 | rorv80 | rorv79 | rorv78 | rorv77 | rorg76 | ldrt | rorv41 | rorv29 | rorv28 | rorv27 | rorv26 | rorv25 | rorv12 |
| /3 | csrv90 | rorv89 | rorv88 | rorv87 | rorv86 | rorg85 | ldrt | rgvw2 | rorv53 | rorv52 | rorv51 | rorv40 | rorv39 | rorv38 | rorv37 |  |  |
| /4 | csrv95 | rorv94 | rorg93 | ldrt | rgvw4 | rorv65 | rgvw3 | rorv54 | rorv62 | rorv61 | rorv60 | rorv50 | rorv49 | rorv48 |  |  |  |
| /5 | ldrt |  |  |  |  |  | rorv64 | rorv63 |  |  | rorv59 | rorv58 |  |  |  |  |  |
| 29/1 |  | rgvw6 | rgvw5 | rorv75 | rgvw4 | rorv74 | rgvw3 | rgvw3 | rgvw2 | rgvw2 | ldrt | rgvw1 | rorv29 | rgvw0 | rorv15 | rotv14 | rotv13 |
| /2 | rgvw6 | rorv84 | rorv83 | rorv82 | rorv74 | rorv74 | rorv72 | rorv71 | rorv53 | rorv53 | rorv42 | rorv41 | rorv28 | rorv27 | rorv26 |  |  |
| /3 | csrv91 | rorv90 | rorv89 | rorv88 | rorv81 | rorv81 | rorv79 | rorv78 | rorv70 | rorv62 | rorv61 | rorv51 | rorv40 | rorv39 | rorv38 |  |  |
| /4 | csrv96 | rorv95 | rorv94 | rorg93 | rorv87 | rorv87 | rorg85 | rorv77 | ldrt |  | rorv69 | rorv50 | rorv49 |  |  |  |  |
| /5 | csrg100 | ldrt |  |  | ldrt | ldrt |  |  |  |  |  | rorv68 | rorv59 |  |  |  |  |
| 30/1 |  | rgvw6 | rorv84 | rgvw5 | rorv75 | rgvw4 | rorv65 | rgvw3 | rorv54 | rgvw2 | ldrt | rgvw1 | rgvw1 | rorv29 | rgvw0 | rotv15 | rotv14 |
| /2 | csrv92 | rorv91 | rorv90 | rorv89 | rorv82 | rorv74 | rorv73 | rorv72 | rorv63 | rorv54 | rorv53 | rorv42 | rorv41 | rorv28 | rorv27 |  |  |
| /3 | csrv97 | rorv96 | rorv95 | rorv90 | rorv88 | rorv81 | rorv80 | rorv79 | rorv71 | rorv63 | rorv62 | rorv52 | rorv51 | rorv40 | rorv39 |  |  |
| /4 | csrv101 | rorg100 | ldrt | rorv94 | rorv87 | rorv87 | rorv86 | rorv78 |  |  | rorv69 | rorv61 | rorv50 |  |  |  |  |
| /5 | ldrt |  |  |  |  | ldrt |  | ldrt |  |  |  |  | rorv60 |  |  |  |  |
| 31/1 |  | rgvw7 | rgvw6 | rgvw5 | rgvw5 | rgvw5 | rgvw4 | rorv65 | rgvw3 | rorv54 | rgvw2 | rgvw2 | rgvw1 | rgvw1 | rorv29 | rgvw0 | rotv15 |
| /2 | rgvw7 | rorv92 | rorv91 | rorv84 | rorv83 | rorv75 | rorv74 | rorv73 | rorv72 | rorv64 | rorv62 | rorv53 | rorv42 | rorv41 | rorv28 |  |  |
| /3 | csrv98 | rorv97 | rorv96 | rorv91 | rorv82 | rorv82 | rorv81 | rorv80 | rorv79 | rorv71 | rorv62 | rorv52 | rorv52 | rorv51 | rorv40 |  |  |
| /4 | csrv102 | rorv101 | rorv97 | rorv85 | rorv85 | rorv85 | rorg87 | ldrt |  |  | rorv70 | rorv62 | rorv61 |  | rorv29 |  |  |
| /5 | csrv106 | ldrt |  |  |  | ldrt |  |  |  |  |  |  |  |  |  |  |  |
| 32/1 |  | ldrt |  | rgvw6 |  |  | rorv75 |  | rgvw4 |  | ldrt |  |  |  | rorv41 |  |  |
| /2 | rgvw7 | rorv99 | rgvw7 | rorv84 | rgvw5 | rgvw5 | rorv75 | rorv74 | rgvw4 | rorv65 | rorv54 | rgvw3 | rorv42 | rorv42 | rorv29 | rgvw1 | rgvw0 |
| /3 | csrv99 | rorv98 | rorv97 | rorv92 | rorv84 | rorv84 | rorv83 | rorv82 | rorv73 | rorv72 | rorv64 | rorv63 | rorv53 | rorv52 |  |  | rorv29 |
| /4 | csrv103 | rorv102 | rorv98 | rorv95 | rorv85 | rorv85 | rorv88 | rorv81 | rorv80 | rorv73 | rorv71 | rorv63 | rorv62 |  |  |  |  |
| /5 | csrv106 | ldrt | rorv101 | rorv100 |  |  | ldrt | ldrt |  | rorv80 | rorv79 | ldrt |  |  |  |  |  |
| 33/1 |  |  |  |  |  | rgvw5 | rgvw5 | rgvw5 | rgvw4 |  |  |  |  |  |  |  |  |
| /2 | rgvw8 | rorv99 | rgvw7 | rgvw7 | rgvw6 | rorv91 | rorv83 | rorv82 | rorv75 | rorv65 | rorv65 | rorv54 | rorv54 | rorv42 | rgvw1 |  |  |
| /3 | csrv104 | rorv103 | rorv98 | rorv97 | rorv91 | rorv90 | rorv89 | rorv83 | rorv82 | rorv80 | rorv73 | rorv64 | rorv63 | rorv52 |  |  |  |
| /4 | csrv107 | ldrt | rorv102 | rorv101 | rorv95 | rorv94 | rorv88 | rorv87 | rorv80 | ldrt | rorv72 | rorv63 |  |  |  |  |  |
| 34/1 |  |  |  |  |  |  |  | ldrt |  |  |  |  |  |  |  |  |  |
| /2 | rgvw8 | rorv99 | rgvw7 | rgvw7 | rgvw7 | rgvw6 | rgvw5 | rgvw5 | rgvw5 | rgvw4 | rorv65 | rgvw3 | rgvw3 | rorv54 | rgvw2 |  |  |
| /3 | csrv104 | rorv103 | rorv98 | rorv97 | rorv92 | rorv91 | rorv90 | rorv83 | rorv83 | rorv74 | rorv73 | rorv64 | rorv64 | rorv53 |  |  |  |
| /4 | csrv108 | rorv107 | rorv102 | rorv101 | rorv97 | rorv96 | rorv95 | rorv89 | rorv88 | rorv81 | rorv80 | rorv72 |  |  |  |  |  |
| /5 | ldrt |  | ldrt |  | ldrt |  |  |  |  | rorv87 |  |  |  |  |  |  |  |
| 35/1 |  |  |  |  |  |  |  |  | rgvw5 |  |  |  |  |  |  |  |  |
| /2 | csrv105 | rorv104 | rorv99 | rorv98 | rorv96 | rorv92 | rorv91 | rorv84 | rorv83 | rorv75 | rorv74 | rorv65 | rorv64 | rorv54 |  |  |  |
| /3 | /2 csrv108 | rorv107 | rorv103 | rorv102 | rorv101 | ldrt | rorv96 | rorv90 | rorv89 | rorv82 | rorv81 | rorv73 |  |  |  |  |  |
| /4 | ldrt | ldrt | ldrt |  |  | ldrt |  |  |  | rorv88 |  |  |  |  |  |  |  |
| 36/1 | rgvw9 | rgvw8 |  |  | rgvw8 |  |  |  | rgvw6 | rgvw6 | rgvw5 |  | rgvw4 | rgvw3 |  |  |  |
| /2 | csrv109 | rorv107 | rorv104 | rorv98 | rorv97 | rorv91 | rorv91 | rorv84 | rorv83 | rorv75 | rorv74 | rgvw4 | rorv65 |  |  |  |  |
| /3 | csrg111 | ldrt | rorv107 | rorv103 | rorv102 | rorv101 | rorv96 | rorv95 | rorv89 | rorv83 | rorv81 | rorv74 |  |  |  |  |  |
| /4 |  |  | ldrt | ldrt | ldrt | ldrt | ldrt | ldrt | ldrt |  |  |  |  |  |  |  |  |
| /5 |  | rgvw9 | rorv105 | rorv104 | rorv103 | rorv98 | rorv97 | rorv92 | rorv91 | rorv84 | rorv82 |  | rgvw4 |  |  |  |  |

TABLE 9-continued

17 × 16 QR Decomposition on Pipelined Linear Array

| step | md | sqr2 | sqr3 | sqr4 | sqr5 | sqr6 | sqr7 | sqr8 | sqr9 | sqr10 | sqr11 | sqr12 | sqr13 | sqr14 | sqr15 | sqr16 | sqr17 |
|---|---|---|---|---|---|---|---|---|---|---|---|---|---|---|---|---|---|
| 37/1 | csrvl110 | rorvl109 | rorvl108 | rorvl107 | rorgl106 | ldrt | | | | | | | | | | | |
| /2 | csrvl112 | rorgl111 | ldrt | | | | | | | | | | | | | | |
| /3 | | | | | | | | | | | | | | | | | |
| /4 | | | | | | | | | | | | | | | | | |
| /5 | | | | | | | | | | | | | | | | | |
| 38/1 | rgvw10 | rorvl110 | rgvw9 | rorvl108 | rgvw8 | | rgvw7 | rorvl92 | rgvw6 | rorvl84 | rgvw5 | rorvl75 | | | | | |
| /2 | csrvl113 | rorvl112 | rorvl109 | rorvl107 | rorvl104 | rorvl103 | rorvl98 | rorvl97 | rorvl91 | rorvl90 | rorvl83 | | | | | | |
| /3 | ldrt | | rorgl111 | ldrt | rorvl107 | rorgl106 | rorvl102 | rorvl101 | rorvl96 | | | | | | | | |
| /4 | | | | | | | ldrt | | | | | | | | | | |
| /5 | | | | | | | | | | | | | | | | | |
| 39/1 | | rgvw10 | rorvl110 | rgvw9 | rorvl109 | rorvl99 | rgvw8 | rgvw7 | rgvw6 | | | rgvw5 | | | | | |
| /2 | csrvl114 | rorvl113 | rorvl112 | rorvl109 | rorvl108 | rorvl104 | rorvl103 | rorvl98 | rorvl92 | rorvl91 | | | | | | | |
| /3 | csrgl115 | ldrt | | rorgl111 | ldrt | rorvl107 | rorgl106 | rorvl102 | rorvl97 | | | | | | | | |
| /4 | | | | | | | | | | | | | | | | | |
| /5 | | | | | | | | | | | | | | | | | |
| 40/1 | | rorvl114 | rgvw10 | rorvl110 | rgvw9 | rorvl105 | rgvw8 | rorvl99 | rgvw7 | rorvl92 | rgvw6 | | | | | | |
| /2 | rgvw11 | rorvl115 | rorvl113 | rorvl112 | rorvl109 | rorvl108 | rorvl104 | rorvl103 | rorvl98 | | | | | | | | |
| /3 | csrvl116 | | ldrt | | rorgl111 | ldrt | rorvl107 | | | | | | | | | | |
| /4 | | | | | | | | | | | | | | | | | |
| /5 | | | | | | | | | | | | | | | | | |
| 41/1 | | | rgvw10 | rorvl110 | rgvw9 | rorvl105 | rgvw8 | rorvl104 | rorvl99 | rgvw7 | | | | | | | |
| /2 | | rgvw11 | rorvl114 | rorvl113 | rorvl110 | rorvl109 | rorvl108 | rorvl105 | | | | | | | | | |
| /3 | csrvl117 | rorvl116 | rorvl115 | ldrt | rorvl112 | rorgl111 | | | | | | | | | | | |
| /4 | ldrt | | | | | | | | | | | | | | | | |
| /5 | | | | | | | | | | | | | | | | | |
| 42/1 | | | rgvw11 | rgvw10 | rgvw9 | rgvw9 | rorvl109 | rgvw8 | | | | | | | | | |
| /2 | | rorvl117 | rorvl114 | rorvl114 | rorvl113 | rorvl110 | rorvl110 | | | | | | | | | | |
| /3 | rgvw12 | ldrt | rorvl116 | rorgl115 | ldrt | rorvl112 | | rgvw9 | | | | | | | | | |
| /4 | csrgl118 | | | | | | | | | | | | | | | | |
| /5 | | | | | | | | | | | | | | | | | |
| 43/1 | | | | rgvw11 | rgvw10 | rgvw10 | rgvw9 | | | | | | | | | | |
| /2 | | rgvw12 | rgvw11 | rorvl114 | rorvl114 | rorvl113 | rorvl109 | | | | | | | | | | |
| /3 | rgvw12 | rorvl118 | rorvl116 | rorgl115 | rorvl115 | | rgvw10 | | | | | | | | | | |
| /4 | csrvl119 | rorgl118 | ldrt | | ldrt | | | | | | | | | | | | |
| /5 | | | | | | | | | | | | | | | | | |
| 44/1 | | | | rgvw11 | rgvw11 | rgvw11 | | | | | | | | | | | |
| /2 | | rorvl117 | rgvw12 | rorvl117 | rorvl116 | rorvl114 | rorvl110 | | | | | | | | | | |
| /3 | rgvw12 | rorvl119 | rorvl117 | ldrt | rorvl117 | | rgvw10 | | | | | | | | | | |
| /4 | rgvw13 | | rorgl118 | | | | | | | | | | | | | | |
| /5 | ldrt | | | | | | | | | | | | | | | | |
| 45/1 | | | | rgvw12 | rgvw12 | rgvw11 | | | | | | | | | | | |
| /2 | | | rgvw12 | rorvl117 | rorvl117 | | | | | | | | | | | | |
| /3 | | | rorgl118 | | | | | | | | | | | | | | |

TABLE 9-continued 17 x 16 QR Decomposition on Pipelined Linear Array

| step | md | sqr2 | sqr3 | sqr4 | sqr5 | sqr6 | sqr7 | sqr8 | sqr9 | sqr10 | sqr11 | sqr12 | sqr13 | sqr14 | sqr15 | sqr16 | sqr17 |
|---|---|---|---|---|---|---|---|---|---|---|---|---|---|---|---|---|---|
| /4 | | rgvw13 | rorv119 | rorg118 | | | | | | | | | | | | | |
| /5 | csrg120 | ldrt | | | | | | | | | | | | | | | |
| 46/1 | | | | | | | | | | | | | | | | | |
| /2 | | | | | | | | | | | | | | | | | |
| /3 | | | rgvw13 | rorv119 | rgvw12 | | | | | | | | | | | | |
| /4 | | rorg120 | ldrt | | | | | | | | | | | | | | |
| /5 | rgvw14 | | rgvw13 | | | | | | | | | | | | | | |
| 47/1 | | | | | | | | | | | | | | | | | |
| /2 | | | | | | | | | | | | | | | | | |
| /3 | | | rgvw14 | rorg120 | | | | | | | | | | | | | |
| /4 | | | | | | | | | | | | | | | | | |
| /5 | | rgvw14 | | | | | | | | | | | | | | | |
| 48/1 | rgrw15 | | | | | | | | | | | | | | | | |
| /2 | | | rgvw14 | | | | | | | | | | | | | | |
| /3 | | | | | | | | | | | | | | | | | |
| /4 | | | | | | | | | | | | | | | | | |
| /5 | | rgrw15 | | | | | | | | | | | | | | | |
| 49/1 util | 62% | 62% | 60% | 59% | 57% | 54% | 51% | 48% | 44% | 40% | 36% | 31% | 26% | 20% | 14% | 7% | |

In the example above, the matrix elements of the equation to be triangulated enter the linear array 220 of FIG. 14 through the inputs at the top of the array. In another embodiment, the matrix elements to be triangulated could already exist inside the register file of the array, having been left there by a previous computation done in the array. In yet another embodiment, the matrix elements to be triangulated could be placed into the register file by another interface such as a DMA interface through port r3 of FIG. 7.

As was described above, the price in latency that was paid for going to a linear array over a two dimensional triangular array was that each time in the algorithm that there is an opportunity to begin zeroing a new column in parallel, the linear array takes a delay of one substep $\phi$. Examining the second column of Table 9, one can see that this happened in the example program fifteen times, corresponding to the opportunity to begin zeroing fifteen new columns. Thus, the additional latency paid by the linear array 220 in this example was fifteen substeps, which equals three steps.

Table 10 compares the figures of merit of the conventional two dimensional triangular array with the pipelined linear array 220 of the present invention. One can see that the pipelined linear array 220 only requires eleven percent of the number of processor elements required by the triangular array, but has a latency which is only an additional six percent. However, it should be noted that the introduction of the pipeline stages into the circuit design could cause the "step" time for the pipelined linear array to be a bit larger than that of the triangular array. In addition, each of the PEs of the linear array generally must contain temporary storage, e.g., in the form of a register file, which is no less than the temporary storage that exists in a distributed manner throughout the two dimensional triangular array. Nevertheless, the present invention provides a considerable reduction in the amount of circuitry required to perform QR decomposition, with little loss in latency.

TABLE 10

17 × 16 QR Decomposition FIGS. of Merit

|  | Triangular Array | Pipelined Linear Array |
|---|---|---|
| Number of Processor Elements | 152 | 17 |
| Last Instruction Step | 46/1 | 49/1 |

Back Substitution

Figure 19:
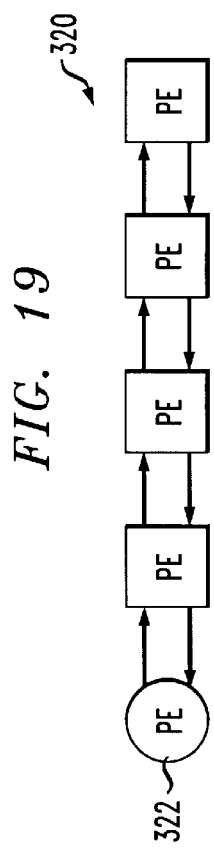
FIG. 19 shows an example of a linear array in accordance with the present invention for implementing an example back substitution operation.

FIG. 19 shows a five element linear array 320 in accordance with the invention. The linear array 320 includes bidirectional interconnections for solving Equation (13) above. At the end of a QR decomposition process, head PE 322 of the array 320 performing the computation holds all the main diagonal elements of the r matrix: $r_{11}$, $r_{22}$, $r_{33}$, and $r_{44}$. The next PE to its right holds the elements of the next diagonal to the right: $r_{12}$, $r_{23}$, $r_{34}$, and $y_4$, etc.

Table 11 shows a general summary of how the linear array 320 of FIG. 19 performs the solution of Equation (13).

TABLE 11

Solution by Back Substitution

|  | rnd1 | sqr2 | sqr3 | sqr4 | sqr5 |
|---|---|---|---|---|---|
| Step 1 | $1/r_{44}$ | | | | |
| Step 2 | $x_4$ | | | | |
| Step 3 | $1/r_{33}$ | $y_3^-$ $r_{34}x_4$ | | | |

TABLE 11-continued

Solution by Back Substitution

|  | rnd1 | sqr2 | sqr3 | sqr4 | sqr5 |
|---|---|---|---|---|---|
| Step 4 | $x_3$ | | $y_2^-$ $r_{24}x_4$ | | |
| Step 5 | $1/r_{22}$ | $y_2^-$ $r_{24}x_4$- $r_{23}x_3$ | | $y_1^-$ $r_{14}x_4$ | |
| Step 6 | $x_2$ | | $y_1^-$ $r_{14}x_4$- $r_{13}x_3$ | | |
| Step 7 | $1/r_{11}$ | $y_1^-$ $r_{14}x_4$- $r_{13}x_3$- $r_{12}x_2$ | | | |
| Step 8 | $x_1$ | | | | |

In step one, the reciprocal of $r_{44}$ is computed in the head PE 322, which is also denoted rnd1. In the second step, the head PE computes the solution for $x_4$ by multiplying the reciprocal of $r_{44}$ with the value of $y_4$ which has been passed to it from the PE to its right, which is denoted sqr2. In the third step, the head PE computes the reciprocal of $r_{33}$. The regular PE to its right (sqr2) multiplies $x_4$ which has been passed to it from its left and $r_{34}$ which is stored in its register file. It subtracts this product from the value of $y_3$ passed to it from the right. In step four, the head PE computes $X_3$ by multiplying the reciprocal of $r_{33}$ with the value of $y_3-r_{34}x_4$ passed to it from the right. The third PE, denoted sqr3, also computes $y_2-r_{24}x_4$. This process continues as shown until step eight when $x_1$ is solved. All of the places where a multiplication is taking place have been indicated in bold. Note that in the computation done by PE sqr2 during step 5, the only multiplication required is $r_{23}x_3$. The rest is passed to it from the right. The latencies of the steps have not been shown. Some operations can in fact be done earlier. For example, the computation of the reciprocal of $r_{33}$ can begin one substep time after the computation of the reciprocal of $r_{44}$ was begun. Note that the efficiency of filling the pipeline for this particular algorithm is low.

Matrix Inversion

As noted previously, a matrix can be inverted by performing a QR decomposition followed by multiple back substitutions sharing a common R. In this section, it is shown how the multiple back substitutions can be performed on a linear array of pipelined elements with little increase in total latency over performing just one back substitution.

Since the multiple back substitution problems of Equation (18) share a common matrix R, the reciprocals of the main diagonal elements of R only need to be computed a single time for all values of j.

TABLE 12

Register Storage Before Inversion

| rnd1 | sqr2 | sqr3 | sqr4 | sqr5 | sqr6 | sqr7 | sqr8 |
|---|---|---|---|---|---|---|---|
| $r_{11}$ | $r_{12}$ | $r_{13}$ | $r_{14}$ | $y_{11}$ | $y_{12}$ | $y_{13}$ | $y_{14}$ |
| $r_{22}$ | $r_{23}$ | $r_{24}$ | $y_{21}$ | $y_{22}$ | $y_{23}$ | $y_{24}$ | |
| $r_{33}$ | $r_{34}$ | $y_{31}$ | $y_{32}$ | $y_{33}$ | $y_{34}$ | | |
| $r_{44}$ | $y_{41}$ | $y_{42}$ | $y_{43}$ | $y_{44}$ | | | |

Table 12 shows what would be stored in the register arrays of an eight element linear array of PEs at the end of QR decomposition. The contents of the register files are the elements of Equation (18).

TABLE 13

Matrix Inversion Example

| | rnd1 | sqr2 | sqr3 | sqr4 | sqr5 | sqr6 | sqr7 | sqr8 |
|---|---|---|---|---|---|---|---|---|
| Step 1/1 | $1/r_{44}$ | | | | | | | |
| Step 1/2 | $1/r_{33}$ | | | | | | | |
| Step 1/3 | $1/r_{22}$ | | | | | | | |
| Step 1/4 | $1/r_{11}$ | | | | | | | |
| Step 1/5 | | | | | | | | |
| Step 2/1 | $x_{41}$ | | | | | | | |
| Step 2/2 | | $x_{42}$ | | | | | | |
| Step 2/3 | | | $x_{43}$ | | | | | |
| Step 2/4 | | | | $x_{44}$ | | | | |
| Step 2/5 | | | | | | | | |
| Step 3/1 | | $Y_{31} - r_{34}x_{41}$ | | | | | | |
| Step 3/2 | | | $y_{32} - r_{34}x_{42}$ | | | | | |
| Step 3/3 | | | | $y_{33} - r_{34}x_{43}$ | | | | |
| Step 3/4 | | | | | $y_{34} - r_{34}x_{44}$ | | | |
| Step 3/5 | | | | | | | | |
| Step 4/1 | $x_{21}$ | | $y_{21} - r_{24}x_{41}$ | | | | | |
| Step 4/2 | | $x_{32}$ | | $y_{22} - r_{24}x_{42}$ | | | | |
| Step 4/3 | | | $x_{33}$ | | $y_{23} - r_{24}x_{43}$ | | | |
| Step 4/4 | | | | $x_{34}$ | | $y_{24} - r_{24}x_{44}$ | | |
| Step 4/5 | | | | | | | | |
| Step 5/1 | | | $y_{21} - r_{24}x_{41} - r_{23}x_{31}$ | | $y_{11} - r_{14}x_{41}$ | | | |
| Step 5/2 | | | | $y_{22} - r_{24}x_{42} - r_{23}x_{32}$ | | $y_{12} - r_{14}x_{42}$ | | |
| Step 5/3 | | | | | $y_{23} - r_{24}x_{43} - r_{23}x_{33}$ | | $y_{13} - r_{14}x_{43}$ | |
| Step 5/4 | | | | | | $y_{24} - r_{24}x_{44} - r_{23}x_{34}$ | | $y_{14} - r_{14}x_{44}$ |
| Step 5/5 | | | | | | | | |
| Step 6/1 | $x_{21}$ | | $y_{11} - r_{14}x_{41} - r_{13}x_{31}$ | | | | | |
| Step 6/2 | | $x_{22}$ | | $y_{12} - r_{14}x_{42} - r_{13}x_{32}$ | | | | |
| Step 6/3 | | | $x_{23}$ | | $y_{13} - r_{14}x_{43} - r_{13}x_{33}$ | | | |
| Step 6/4 | | | | $x_{24}$ | | $y_{14} - r_{14}x_{44} - r_{13}x_{34}$ | | |
| Step 6/5 | | | | | | | | |
| Step 7/1 | | $y_{11} - r_{14}x_{41} - r_{13}x_{31} - r_{12}x_{21}$ | | | | | | |

TABLE 13-continued

Matrix Inversion Example

| | rnd1 | sqr2 | sqr3 | sqr4 | sqr5 | sqr6 | sqr7 | sqr8 |
|---|---|---|---|---|---|---|---|---|
| Step 7/2 | | | $y_{12}$ – $r_{14}x_{42}$ – $r_{13}x_{32}$ – $r_{12}x_{22}$ | | | | | |
| Step 7/3 | | | | $y_{13}$ – $r_{14}x_{43}$ – $r_{13}x_{33}$ – $r_{12}x_{23}$ | | | | |
| Step 7/4 | | | | | $y_{14}$ – $r_{14}x_{44}$ – $r_{13}x_{34}$ – $r_{12}x_{24}$ | | | |
| Step 7/5 | | | | | | | | |
| Step 8/1 | $x_{11}$ | | | | | | | |
| Step 8/2 | | $x_{12}$ | | | | | | |
| Step 8/3 | | | $x_{13}$ | | | | | |
| Step 8/4 | | | | $x_{14}$ | | | | |

Table 13 shows how an eight element linear array in accordance with the present invention can perform matrix inversion. It basically shows four copies of the example of Table 11 that have been interleaved into unused pipeline stages of the array. In the illustrative embodiment shown in FIG. 7, up to two complex numbers can be passed from right to left and another two from left to right per cycle. The inversion example of Table 13 does at most one complex multiplication per PE per cycle, while the hardware has the ability to do more than one multiplication per cycle per PE. In addition, there are many additional unused substeps in the pipeline which are available. It will be understood by those skilled in the art that there are in fact many possible instruction sets and program solutions in which the reciprocals and non-diagonal elements of R are passed to the right and partial results are passed to the left to solve matrix inversion. It should also be noted that the total latency for performing the four back substitutions is only about 8 percent longer than for performing only a single back substitution, and that the pipeline of the array is still poorly utilized with many remaining idle PEs.

Matrix-Matrix Multiplication

Figure 20:
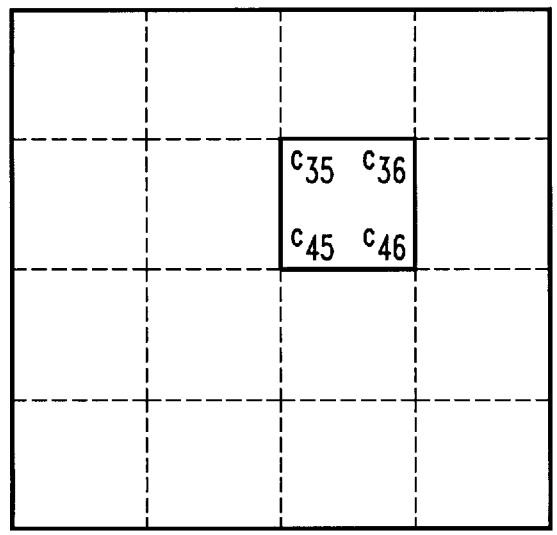
FIG. 20 illustrates the manner in which a matrix can be divided into sub-matrices to facilitate matrix-matrix multiplication on a linear array in accordance with the invention.

In this section, it is shown how to perform the multiplication of two eight by eight complex matrices to form a third complex matrix, AB≡C, using the example linear array 230 of FIG. 15. The technique used is to break the computation into blocks or sub-matrices. FIG. 20 shows the eight by eight complex product matrix C divided up into sixteen, two by two product sub-matrices. One sub-matrix is emphasized in the figure, showing the elements $c_{35}$, $c_{36}$, $c_{45}$, and $c_{46}$. In the example that will be shown below, each PE of the four element array 230 of FIG. 15 will be dedicated to computing one of the four columns of FIG. 20, with the emphasized sub-matrix to be computed by the third PE from the left. An entire row out of the four rows of FIG. 20 will be computed simultaneously by the four PEs in the array.

Figure 21:
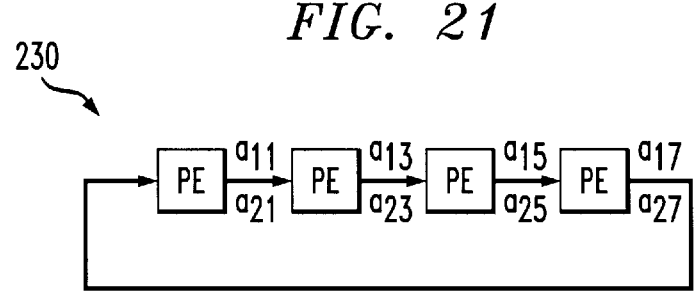
FIGS. 21 and 22 illustrate the performance of matrix-matrix multiplication utilizing the linear array of FIG. 15.
Figure 22:
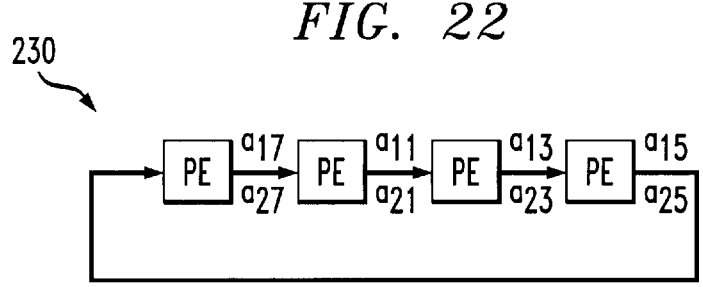

When working on one row of FIG. 20, the array 230 circulates values of the rows of A around the array, while the columns of B stay within the designated PEs. FIG. 21 shows one step in the matrix-matrix multiplication. Pairs of complex values on rows one and two of A are available on the ilc and ils inputs (see FIG. 7) of each PE. They are multiplied by a pair of complex values from two columns of B in each PE. In FIG. 22, the next step is shown where the pairs of values of A have been shifted clockwise to the next PE and the next multiplication begins. After four such steps, the other set of values on the same two rows of A, i.e., the values $a_{12}$, $a_{22}$, $a_{14}$, $a_{24}$, $a_{16}$, $a_{26}$, $a_{18}$, and $a_{28}$, are loaded and the process continues for four more steps. At that point, all of the multiplications have been begun that are needed to produce all of the results of rows one and two of C. Then the process starts again, this time for rows three and four.

TABLE 14

Instructions for Matrix-Matrix Multiplication

| Instruction Mnemonic | Description |
|---|---|
| lgl1 | 'l'oad, 'g' register and 'l'eft c,s from r1, r2 |
| mag1 | 'm'ultiply-'a'ccumulate, load 'g' from r1 |
| magh | 'm'ult-'a'cc, load 'g' and 'h' from r1,r2 |
| mah1 | 'm'ult-'a'cc left c,s with 'h', load left c,s and g from r2,r1 |
| mal1 | 'm'ult-'a'cc, load 'l'eft and 'g' from r2,r1 |
| maw1 | 'm'ult-'a'cc, load 'l'eft and 'g' from r2,r1 |
| mcg1 | 'm'ultiply 'c',s and 'g', load g from r1 |
| zsw1 | 'w'rite results using r1,r2 |

Table 14 shows some possible instructions that could be added to the instruction set previously shown in Table 8 for performing matrix-matrix multiplication. In Table 15, a program is shown for controlling the linear array 230 of FIG. 15 for performing the multiplication of two eight by eight complex matrices to form a third complex matrix, AB≡C. At the beginning of the program, the first two columns of A and B have previously been stored in the first PE on the left. The third and fourth columns have previously been stored in the second PE, etc. The first two columns of the product C once formed will be left in the first PE, the third and fourth columns in the second PE, etc. In the program listing of Table 15, the first four columns contain the instruction mnemonics to be used. Four consecutive lines give the individual instructions controlling the four PEs respectively.

In the columns to the right of the mnemonic are shown values for fields which indicate the control for each of two ports to the register file. The field names, drow, x, and c, correspond to the controls described in Table 6.

TABLE 15

Program for Matrix-Matrix Multiplication

```
# Program for multiplication of two complex 8x8 matrices on a four
# element array. The two matrices to be multiplied are initialized in the
# register files before the beginning of this program. The results are left
# in the register file. Text below to the right of column 18 are comments.

#    [ r1 ] [ r2 ]
#    dd x c dd x c
#    rr     rr
#    oo     oo
#    ww     ww       <- Everything between the arrows are comments ->
lgl1,04,0,0,00,1,0 g=b11,b12 il=a11,a21
lgl1,05,0,0,00,1,0 g=b33,b34 il=a13,a23
lgl1,06,0,0,00,1,0 g=b55,b56 il=a15,a25
lgl1,07,0,0,00,1,0 g=b77,b78 il=a17,a27
1/1--------------
mcg1,07,0,0,00,0,0 g=b71,b72           c11 =a11b11 c12,c21,c22
mcg1,04,0,0,00,0,0 g=b13,b14           c13 =a13b33 c14,c23,c24
mcg1,05,0,0,00,0,0 g=b35,b36           c15 =a15b55 c16,c25,c26
mcg1,06,0,0,00,0,0 g=b57,b58           c17 =a17b77 c18,c27,c28
1/2--------------
mag1,06,0,0,00,0,0 g=b51,b52           c11+=a17b71 c12,c21,c22
mag1,07,0,0,00,0,0                     c13+=a11b13 c14,c23,c24
mag1,04,0,0,00,0,0                     c15+=a13b35 c16,c25,c26
mag1,05,0,0,00,0,0                     c17+=a15b57 c18,c27,c28
1/3--------------
mag1,05,0,0,00,0,0 g=b31,b32           c11+=a15b51 c12,c21,c22
mag1,06,0,0,00,0,0
mag1,07,0,0,00,0,0
mag1,04,0,0,00,0,0
1/4--------------
mal1,04,0,1,00,1,1 g=b21,b22 il=a12,a22 c11+=a13b31 c12,c21,c22
mal1,05,0,1,00,1,1
mal1,06,0,1,00,1,1
mal1,07,0,1,00,1,1
1/5--------------
mag1,07,0,1,00,0,0 g=b81,b82           c11+=a12b21 c12,c21,c22
mag1,04,0,1,00,0,0
mag1,05,0,1,00,0,0
mag1,06,0,1,00,0,0
2/1--------------
mag1,06,0,1,00,0,0 g=b61,b62           c11+=a18b81 c12,c21,c22
mag1,07,0,1,00,0,0
mag1,04,0,1,00,0,0
mag1,05,0,1,00,0,0
2/2--------------
mag1,05,0,1,00,0,0 g=b41,b42           c11+=a16b61 c12,c21,c22
mag1,06,0,1,00,0,0
mag1,07,0,1,00,0,0
mag1,04,0,1,00,0,0
2/3--------------
mal1,04,0,0,01,1,0 g=b11,b12 il=a31,a41 c11+=a14b41 c12,c21,c22
mal1,05,0,0,01,1,0
mal1,06,0,0,01,1,0
mal1,07,0,0,01,1,0
2/4--------------
mcg1,07,0,0,00,0,0 g=b71,b72           c31 =a31b11 c32,c41,c42
mcg1,04,0,0,00,0,0
mcg1,05,0,0,00,0,0
mcg1,06,0,0,00,0,0
2/5--------------
mag1,06,0,0,00,0,0 g=b51,b52           c31+=a37b71 c32,c41,c42
mag1,07,0,0,00,0,0
mag1,04,0,0,00,0,0
mag1,05,0,0,00,0,0
3/1--------------
magh,05,0,0,07,0,1 g=b31,b32 ga=b81,b82 c31+=a35b51 c32,c41,c42
magh,06,0,0,04,0,1
magh,07,0,0,05,0,1
magh,04,0,0,06,0,1
3/2--------------
mal1,04,0,1,01,1,1 g=b21,b22 il=a32,a42 c31+=a33b31 c32,c41,c42
mal1,05,0,1,01,1,1
```

TABLE 15-continued

Program for Matrix-Matrix Multiplication

```
mal1,06,0,1,01,1,1
mal1,07,0,1,01,1,1
3/3--------------
maw1,08,0,0,08,0,1 r1<=c11,12 r2<=c21,22  c31+=a32b21 c32,c41,c42
maw1,08,0,0,08,0,1 r1<=c13,14 r2<=c23,24
maw1,08,0,0,08,0,1 r1<=c15,16 r2<=c25,26
maw1,08,0,0,08,0,1 r1<=c17,18 r2<=c27,28
3/4--------------
mah1,06,0,1,00,0,0 g=b61,b62              c31+=a38b81 c32,c41,c42
mah1,07,0,1,00,0,0
mah1,04,0,1,00,0,0
mah1,05,0,1,00,0,0
3/5--------------
mag1,05,0,1,00,0,0 g=b41,b42              c31+=a36b61 c32,c41,c42
mag1,06,0,1,00,0,0
mag1,07,0,1,00,0,0
mag1,04,0,1,00,0,0
4/1--------------
mal1,04,0,0,02,1,0 g=b11,b12 il=a51,a61   c31+=a34b41 c32,c41,c42
mal1,05,0,0,02,1,0
mal1,06,0,0,02,1,0
mal1,07,0,0,02,1,0
4/2--------------
mcg1,07,0,0,00,0,0 g=b71,b72              c51 =a51b11 c52,c61,c62
mcg1,04,0,0,00,0,0
mcg1,05,0,0,00,0,0
mcg1,06,0,0,00,0,0
4/3--------------
mag1,06,0,0,00,0,0 g=b51,b52              c51+=a57b71 c52,c61,c62
mag1,07,0,0,00,0,0
mag1,04,0,0,00,0,0
mag1,05,0,0,00,0,0
4/4--------------
mag1,05,0,0,00,0,0 g=b31,b32              c51+=a55b51 c52,c61,c62
mag1,06,0,0,00,0,0
mag1,07,0,0,00,0,0
mag1,04,0,0,00,0,0
4/5--------------
mal1,04,0,1,02,1,1 g=b21,b22 il=a52,a62   c51+=a53b31 c52,c61,c62
mal1,05,0,1,02,1,1
mal1,06,0,1,02,1,1
mal1,07,0,1,02,1,1
5/1--------------
maw1,09,0,0,09,0,1 r1<=c31,32 r2<=c41,42  c51+=a52b21 c52,c61,c62
maw1,09,0,0,09,0,1 r1<=c33,34 r2<=c43,44
maw1,09,0,0,09,0,1 r1<=c35,36 r2<=c45,46
maw1,09,0,0,09,0,1 r1<=c37,38 r2<=c47,48
5/2--------------
mah1,06,0,1,00,0,0 g=b61,b62              c51+=a58b81 c52,c61,c62
mah1,07,0,1,00,0,0
mah1,04,0,1,00,0,0
mah1,05,0,1,00,0,0
5/3--------------
mag1,05,0,1,00,0,0 g=b41,b42              c51+=a56b61 c52,c61,c62
mag1,06,0,1,00,0,0
mag1,07,0,1,00,0,0
mag1,04,0,1,00,0,0
5/4--------------
mal1,04,0,0,03,1,0 g=b11,b12 il=a71,a81   c51+=a54b41 c52,c61,c62
mal1,05,0,0,03,1,0
mal1,06,0,0,03,1,0
mal1,07,0,0,03,1,0
5/5--------------
mcg1,07,0,0,00,0,0 g=b71,b72              c71 =a71b11 c72,c81,c82
mcg1,04,0,0,00,0,0
mcg1,05,0,0,00,0,0
mcg1,06,0,0,00,0,0
6/1--------------
mag1,06,0,0,00,0,0 g=b51,b52              c71+=a77b71 c72,c81,c82
mag1,07,0,0,00,0,0
mag1,04,0,0,00,0,0
mag1,05,0,0,00,0,0
6/2--------------
mag1,05,0,0,00,0,0 g=b31,b32              c71+=a75b51 c72,c81,c82
mag1,06,0,0,00,0,0
```

TABLE 15-continued

Program for Matrix-Matrix Multiplication

```
mag1,07,0,0,00,0,0
mag1,04,0,0,00,0,0
6/3--------------
mal1,04,0,1,03,1,1 g=b21,b22 il=a72,a82        c71+=a73b31 c72,c81,c82
mal1,05,0,1,03,1,1
mal1,06,0,1,03,1,1
mal1,07,0,1,03,1,1
6/4--------------
maw1,10,0,0,10,0,1 r1<=c51,52 r2<=c61,62       c71+=a72b21 c72,c81,c82
maw1,10,0,0,10,0,1 r1<=c53,54 r2<=c63,64
maw1,10,0,0,10,0,1 r1<=c55,56 r2<=c65,66
maw1,10,0,0,10,0,1 r1<=c57,58 r2<=c67,68
6/5--------------
mah1,06,0,1,00,0,0 g=b61,b62                   c71+=a78b81 c72,c81,c82
mah1,07,0,1,00,0,0
mah1,04,0,1,00,0,0
mah1,05,0,1,00,0,0
7/1--------------
mag1,05,0,1,00,0,0 g=b41,b42                   c71+=a76b61 c72,c81,c82
mag1,06,0,1,00,0,0
mag1,07,0,1,00,0,0
mag1,04,0,1,00,0,0
7/2--------------
mal1,04,0,0,00,0,0 g=b11,b12                   c71+=a74b41 c72,c81,c82
mal1,05,0,0,00,0,0
mal1,06,0,0,00,0,0
mal1,07,0,0,00,0,0
7/3--------------
noop,00,0,0,00,0,0
noop,00,0,0,00,0,0
noop,00,0,0,00,0,0
noop,00,0,0,00,0,0
7/4--------------
noop,00,0,0,00,0,0
noop,00,0,0,00,0,0
noop,00,0,0,00,0,0
noop,00,0,0,00,0,0
7/5--------------
noop,00,0,0,00,0,0
noop,00,0,0,00,0,0
noop,00,0,0,00,0,0
noop,00,0,0,00,0,0
8/1--------------
noop,00,0,0,00,0,0
noop,00,0,0,00,0,0
noop,00,0,0,00,0,0
noop,00,0,0,00,0,0
8/2--------------
zsw1,11,0,0,11,0,1 r1<=c71,72 r2<=c81,82
zsw1,11,0,0,11,0,1 r1<=c73,74 r2<=c83,84
zsw1,11,0,0,11,0,1 r1<=c75,76 r2<=c85,86
zsw1,11,0,0,11,0,1 r1<=c77,78 r2<=c87,88
8/3--------------
noop,00,0,0,00,0,0
noop,00,0,0,00,0,0
noop,00,0,0,00,0,0
noop,00,0,0,00,0,0
8/4--------------
noop,00,0,0,00,0,0
noop,00,0,0,00,0,0
noop,00,0,0,00,0,0
noop,00,0,0,00,0,0
8/5--------------
```

The program of Table 15 begins by loading the two g registers and two input left registers of each PE with the initial values. The next substep initiates the multiplication of four cross products and shifting of A values clockwise around the array. The following instructions initiate multiply-accumulate instructions to add to the accumulating C cross products. In substep 1/4, new values of A are read from the register file. In substep 2/3, the final multiply-accumulate is begun for completion of the computation of four elements of C in each PE, i.e., c11, c12, c21, and c22 in the first PE, c13, c14, c23, c24, in the second PE, etc. Because of the pipeline latency, these results are not written back to the register file until substep 3/3. Meanwhile, the array has started computing the next set of values of C in substep 2/4. The final multiplications are begun in substep 7/2 and after the pipeline latency, the final results are written to the register files in substep 8/2. Thus the eight by eight complex matrix-matrix multiplication takes less than forty substeps to complete on the array 230.

For multiplication of complex matrices with odd dimension (e.g. seven by seven), one can always zero pad the matrices to the next even dimension and follow the procedure above for eight by eight multiplication. However, this would lead to inefficiency due to extra unneeded multiplications. It will be evident to those skilled in the art that alternatively, appropriate instructions could be added to those of Table 14 to deal with the odd dimension cases.

Larger matrices can be multiplied together on the same size array by storing more columns in each register file. For example, a sixteen by sixteen complex matrix-matrix multiplication can be performed on the linear array 230 of FIG. 15 by storing the first four columns in the first PE, columns five through eight on the second PE, etc. For matrices which are so large that they do not fit into the register files of the array, the matrices can be broken up into blocks that do fit and known block matrix multiplication methods may be used. In this case, the host processor or dedicated logic using the third register file ports would have to be cooperating with tightly coupled uploading and downloading of the blocks.

Formation of Covariance and Cross Correlation

In this section, it is shown how the linear array 240 of FIG. 16 can be used to compute covariance and cross correlation simultaneously. Equations (23) and (24) show that in order to compute covariance and cross correlation, one needs to compute terms of the form: $xx^H$ and $xy_d$.

Figure 23:
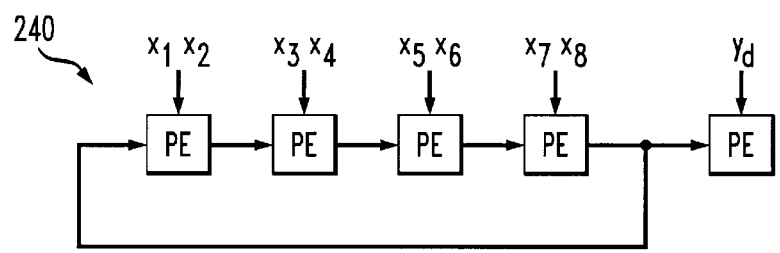
FIGS. 23 and 24 illustrate the computation of covariance and cross correlation utilizing the linear array of FIG. 16.
Figure 24:
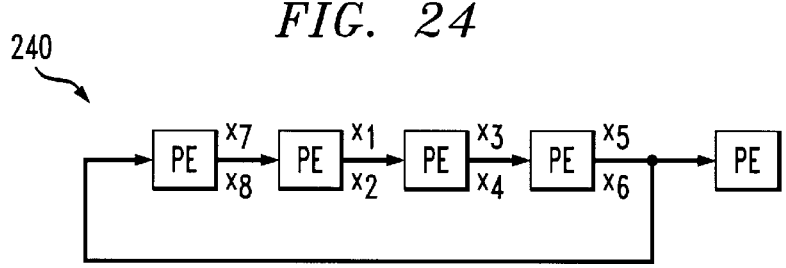

Computation of covariance is of lower complexity than the matrix-matrix multiplication described above. If two N by N matrices are multiplied, it requires $N^3$ multiplications. Computation of covariance only takes $N^2$ multiplications. In the example given below, the input vector, x (e.g. data coming from an array of antennas), and the expected value $y_d$ enter the array 240 from the top, as shown in FIG. 23, and are loaded into the g1, h2, ilc0(1), and ils0(1) registers shown in FIG. 7 for each of the four leftmost PEs and the g1 register for the fifth PE. In the next substep, each of the first four PEs compute the four cross products of the two values that had been input in the previous step with themselves. For example, the first PE on the left would compute the four terms $x_1 x_1^*$, $x_1 x_2^*$, $x_2 x_1^*$, and $x_2 x_2^*$. At the same time, the values in the ilc0(1) and ils0(1) registers would be propagated to the right. In the next substep, each of the first four PEs would compute the four cross products of the values that were on their left inputs and the values that are held in g1 and h2. The PE on the right would compute the two products $x_7 y_d^*$ and $x_8 y_d^*$. FIG. 24 shows the data that is on the clockwise interconnections in the third substep. At the end of the pipeline delay for each multiplication, the completed terms could be written to the register file. Alternatively, the completed terms could first be weighted and averaged in with the previous value that was stored in the register file in order to update the time average. Formation of covariance and cross correlation for the example shown could then be completed in only a few steps. It will be apparent to those skilled in the art that the array could be configured and programmed in other ways in order to compute a covariance and cross correlation.

Square Root Normalization Process

The square root normalization process previously mentioned in conjunction with FIG. 10 will now be described in greater detail in conjunction with FIGS. 25, 26 and 27. This aspect of the invention provides digital hardware to assist in the range reduction of an argument to a function, and the subsequent transformation of the result to achieve the desired function. For purposes of illustration, the function is assumed to be given by:

$$y(x) = \frac{1}{\sqrt{x}}. \tag{26}$$

Figure 25:
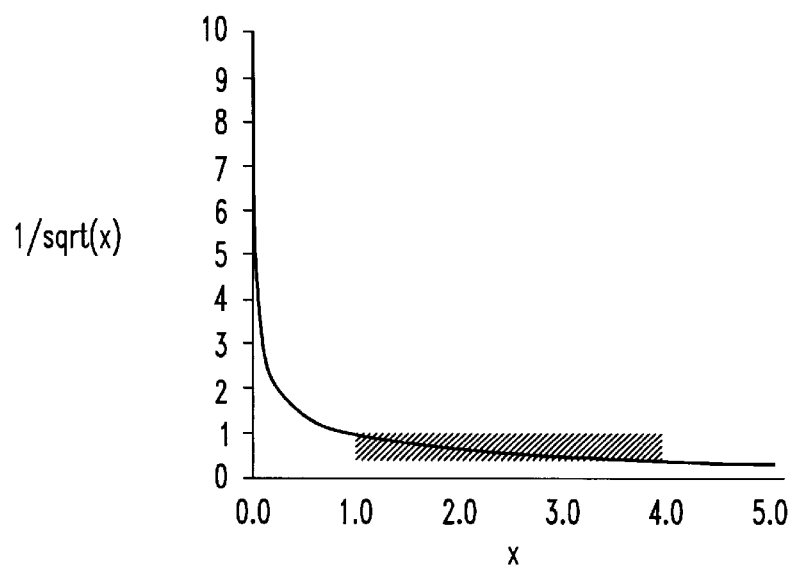
FIG. 25 is a plot illustrating an inverse square root range reduction that may be implemented using a square root normalization process of the present invention.

This inverse square root function is plotted in FIG. 25. It can be seen from the plot that for small values of x, the inverse square root function becomes very steep. A shaded portion of the plot corresponds to a range of $0.5 < y(x) \leq 1$ and $1 \leq x < 4$. In the shaded portion, the function is not steep and accuracy can be more easily achieved using a known technique such as interpolation between values in a table.

The normalization process to produce values in the reduced range corresponding to the shaded portion of FIG. 25 may make use of the identity:

$$\frac{1}{\sqrt{2^{2n} x}} = \frac{1}{2^n \sqrt{x}}. \tag{27}$$

If shifts are restricted to an even number of bits $2n$, where n is an integer, one can perform an "even" normalization where after shifting, at least one of the two most significant data bits contains a logic one. A number of examples are given in Table 16 below.

TABLE 16

Examples of Normalization of x

| Argument x Before Normalization | Normalized x | 2n |
|---|---|---|
| $.11011_b = .84375$ | $11.011_b = 3.375$ | −2 |
| $101.1_b = 5.5$ | $01.011_b = 1.375$ | 2 |
| $.0001101_b = .1015625$ | $01.101_b = 1.625$ | −4 |
| $.000010111_b = .044921875$ | $10.111_b = 2.875$ | −6 |

The values in the first two columns Table 16 to the left of the "=" are in fixed point binary notation and the values to the right of the "=" are in decimal notation.

Notice that the original arguments ranged in value from 0.04 to 6. The range of the normalized x is $1.0 \leq x < 4$. The position of the binary point in the normalized x is arbitrary. The important thing is that the ratio of the maximum to minimum x after normalization equals four. However, 1 to 4 is a good domain to choose for x because the function is not steep there, so interpolation or other known techniques can achieve high accuracy.

Once the normalized x has been determined, the computation of the inverse square root of the normalized value x can then proceed using techniques known in the art, such as power series expansions, table driven interpolation methods, and Newton-Raphson regression. FIG. 26 illustrates a possible hardware implementation of the above-described "even" normalization process. Each pair of neighboring bits of the argument x before normalization may be input to a corresponding two input OR gate in a series of OR gates 325 as shown to indicate if one, the other or both have the value of logic one. In the FIG. 26 example, Wbits denotes the number of whole bits to the left of the binary point, and is an even number, twelve in this example. Fbits denotes the total number of fractional bits of x, and in this example is eight. The series of OR gates 325 includes ten OR gates that look at neighboring pairs of bits of x.

The outputs of the series of OR gates 325 are input to a priority encoder 327 of a type known in the art for existing hardware normalizers. The encoder 327 outputs the value of 2n corresponding to the particular OR gate with an output of logic one closest in position to the most significant bit of the argument. The value at the output of the encoder 327 controls a barrel shifter 330 which shifts the argument by 2n bits to form the normalized x.

More specifically, the priority encoder 327 outputs a number corresponding to the position of the first logic one input looking from the left towards the right. In this example, the first one comes from the second OR gate from the left. The numbers from 0 to 18 shown next to the inputs from the OR gates are the value of 2n that are output by the priority encoder 327, so in this example, 2n=2 is output. As previously noted, the number 2n is used to control barrel shifter 330 which shifts x to form a normalized mantissa which always has a logic one in the leftmost or next to leftmost position.

Figure 26:
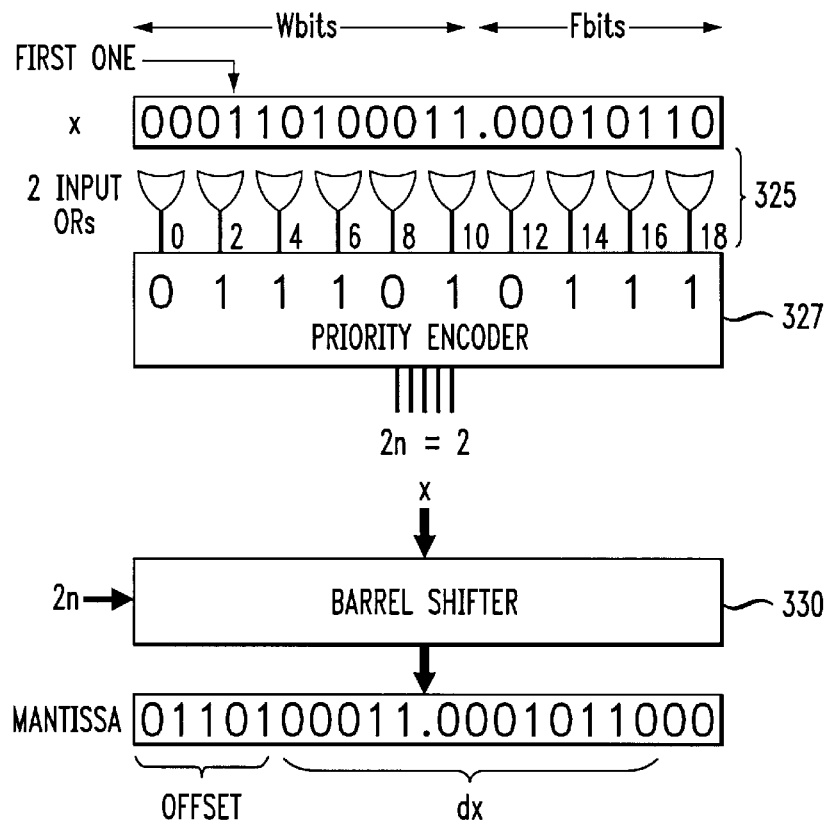
FIGS. 26 and 27 show examples of normalization hardware in accordance with the invention.

Sections of bits of the normalized mantissa in FIG. 26 have been labeled as the "offset," which was previously referred to in conjunction with FIG. 10. These bits may be used as an address to look up an approximation of the function from a lookup table, e.g., a table stored in a Read Only Memory (ROM) or other type of memory. In the example, the offset has five bits which would indicate a table with thirty-two words. However, the lowest quarter of those words, corresponding to $0 \leq x < 1$, are never called for, and hence the lookup table only needs to have twenty-four words. Also in FIG. 26, some number of bits to the right of the offset are labeled "dx." These bits indicate the amount that x is greater than the value of the offset. If a linear interpolation algorithm were used, then the lookup table would include both the value of y(offset) and the slope of y(normalized x) at the offset. The value of dx would be multiplied by the slope found from the table and added to the value at the offset to find the value of y(normalized x) at normalized x.

Following the computation of the inverse square root of the normalized x, one can then obtain the desired inverse square root of the original argument by shifting the result in the opposite direction from the normalization shift by half the number of bits. In other words, if the normalization had used a shift of 2n=6 bits to the right, then the denormalization would shift the result by a constant +(n=3) bits to the left. Hence, by building hardware that implements the identity given above, one can easily reduce the range of the argument, and also easily adjust the result.

Referring again to the example of FIG. 26, note that the binary point of x is Wbits from the left. The values in the lookup table are based on the binary point being in the position two bits from the left as shown in Table 16. Thus there is a constant shift required for denormalization equal to (Wbits−2)/2 in addition to the variable shift of n bits due to the barrel shifter 330. The value of y(normalized x) noted above can therefore be denormalized by a barrel shifter which shifted it in the reverse direction by (n−1−(Wbits/2)) bits resulting in the desired y(x).

Figure 27:
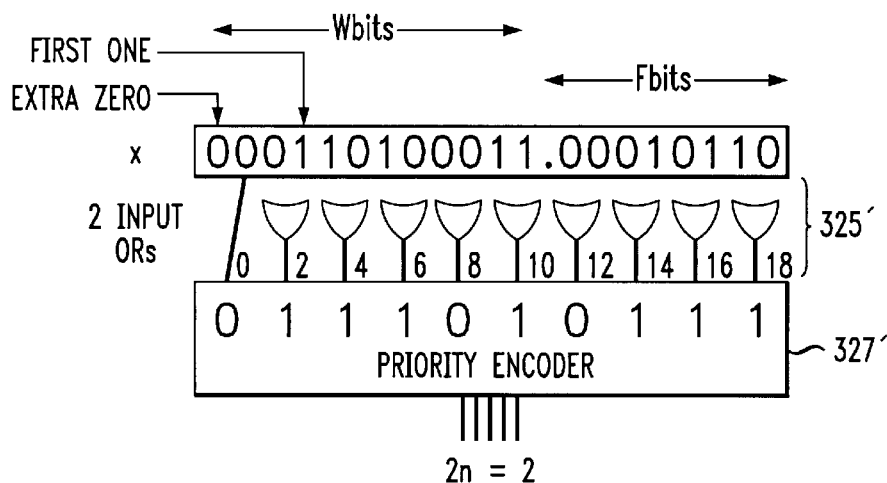

FIG. 27 illustrates the differences in the normalization process for a case in which the whole number of bits is odd. In this example, Wbits is eleven. An extra zero is prepended to x to make it have an even number of whole bits. A set of OR gates 325' in this example corresponds to the set of OR gates 325 of FIG. 26 but with the first OR gate eliminated, and the bit to the right of the prepended bit is input directly to a priority encoder 327'.

Although the normalization technique described above is illustrated for the computation of an inverse square root, it can also be applied to the computation of the square root. This technique may be extended in a straightforward manner to other fractional powers such as cube root, etc. For example, for the cube root, one would build a normalizer constrained to shift by multiples of 3 bits, and so on.

The above-described embodiments of the invention are illustrative only. Alternative embodiments may utilize different configurations for the processor elements and linear arrays thereof, and may perform computational operations other than those described. These and numerous other alternative embodiments within the scope of the appended claims will be readily apparent to those skilled in the art.

What is claimed is:

1. An apparatus comprising at least one digital processor element, the digital processor element comprising:
    arithmetic circuitry operative to multiply real and imaginary parts of at least two complex numbers by real and imaginary parts of at least another two complex numbers thereby forming at least sixteen partial products, and to form one or more additive combinations of the partial products, each of the additive combinations representing a real or imaginary number; and
    a register file having at least a first port and a second port, each of the first and second ports being capable of reading two complex words or writing two complex words to or from the register file, the ports being coupled to the arithmetic circuitry for supplying the complex numbers thereto and receiving the real or imaginary numbers therefrom.

2. The apparatus of claim 1 wherein the arithmetic circuitry comprises pipelined logic configured such that latency for an operation from beginning to completion is longer than a period with which new operations can be initiated, the processor element thereby being capable of computing more than one operation at a time, each operation having a different starting time.

3. The apparatus of claim 1 wherein at least one of the first or second ports of the register file comprises logic that controllably pairs word lines together, such that a given set of the two complex words to be accessed by reading or writing may be from the same word line or alternatively one from each of a pair of word lines.

4. The apparatus of claim 3 wherein associated with the at least one port in the register file is a crossbar switch which allows the given set of the two complex words to be read or written in a desired order.

5. The apparatus of claim 4 wherein the register file further includes a third port containing a bi-directional data bus, an address input bus and a control input, the third port being used by another processing device to read or write values to the register file independent of any other computation activity of the processor element.

6. The apparatus of claim 5 wherein a linear array of the processor elements is contained within a digital co-processor having an interface port serving the co-processor and a logic block for the interface of the third ports of the processor elements through the interface port to a host processor, the logic block containing mapping logic to reorder matrix elements that enter or leave the interface port to or from distributed storage in the register files of the processor elements.

7. The apparatus of claim 1 wherein the arithmetic circuitry further comprises at least eight adders having inputs adapted to receive the partial products, the adders being capable of forming one or more additive combinations of the partial products, each of the adders representing a real or imaginary number, the eight adders together being capable of forming four complex number sums and each adder having a feedback connection from a result that it has added back to its input such that it can accumulate a new sum corresponding to a sum of a new input number and the previous sum.

8. The apparatus of claim 7 wherein the arithmetic circuitry further comprises a control circuit operative to allow each of the adders to begin computing a new sum or alternatively to accumulate a new sum as the sum of the previous sum and a new input value, and connections for supplying the sixteen partial products to the eight adders such that four pairs of the adders can accumulate the four complex cross products of two complex numbers and another two complex numbers input to the arithmetic means.

9. The apparatus of claim 1 further comprising a linear array of the processor elements, each of the processor elements in the linear array being coupled to at least one other processor element in the array.

10. The apparatus of claim 9 wherein a given one of the processor elements in the array includes at least one port providing connection to another of the processor elements in the array, the port allowing at least one complex number to be passed between the given processor element and the other processor element.

11. The apparatus of claim 9 wherein the linear array of the processor elements further comprises a head processor element and a plurality of regular processor elements, the head processor element providing a superset of the functionality of each of the regular processor elements.

12. The apparatus of claim 11 wherein the head processor element is configured to compute a Givens rotation of two complex numbers by computing the sum of the squares of the absolute values of the two complex numbers, normalizing the sum, computing the inverse square root of the sum using the non-linear function generator, multiplying the inverse square root separately by each of the two complex numbers and by the sum, and denormalizing the three resulting products using the exponent to control the amount of shifting of the products.

13. The apparatus of claim 11 wherein the linear array is configured to perform a QR decomposition of a matrix, the array further comprising:
    bi-directional interconnections between each processor element and its neighbor allowing complex c and s values of the Givens rotation to be passed from the head element to the second processor element, the c and s values then to be passed from one processor element to the next processor element through the array;
    a program including instruction words containing individual sub-instructions directed to each of the processor elements, each of the sub-instructions being applied to its associated processor element; and
    a sequencer for successively applying the instruction words in time to control the functioning of the array, such that the program controls the array to perform the QR decomposition of the matrix.

14. The apparatus of claim 13 wherein elements of the matrix upon which QR decomposition is to be performed are input to the processor elements via external data input ports associated therewith.

15. The apparatus of claim 13 wherein elements of the matrix upon which QR decomposition is to be performed reside in the register files associated with the processor elements at the beginning of the computation.

16. The apparatus of claim 13 being further operative to solve a set of linear equations represented as a matrix equation, by first performing the QR decomposition of the matrix equation, where the resulting matrix equation in triangular form is stored in the register files of the processor elements of the array and where the apparatus then solves the matrix equation in triangular form by utilizing back substitution, the back substitution being accomplished by storing additional program instructions in an instruction memory and sequencing the additional instructions to control the functioning of the array.

17. The apparatus of claim 13 being further operative to find the inverse of a known matrix, beginning with an identity that the known matrix times its unknown inverse equals the identity matrix and representing this identity by a matrix representation comprising the known matrix with the identity matrix concatenated to it and performing QR decomposition on the matrix representation, wherein the resulting matrix equation in triangular form is stored in the register files of the processor elements of the array and wherein the apparatus then solves for the unknown inverse matrix by utilizing multiple back substitution operations, each of the back substitution operations being accomplished by storing additional program instructions in an instruction memory and sequencing the additional instructions to control the functioning of the array.

18. The apparatus of claim 11 being operative to multiply two input matrices, the apparatus storing the two input matrices to be multiplied together in the register file of a given processor element of the array, the register file of the given processor element being organized such that two by two complex sub-matrices of each of the two matrices to be multiplied are stored in pairs of word lines so that a pair of complex words representing either a row or a column of a the sub-matrix may be directed to a register file port, the apparatus further comprising:
   a program including instruction words containing instructions to control the given processor element, the instructions being applied to the given processor element;
   a sequencer for successively applying the instructions in time to control the functioning of the given processor element, such that the program sequentially places pairs of values from two rows of the first input matrix and pairs of values from two columns of the second input matrix at the inputs to the arithmetic circuitry of the processor element, the program controlling the given processor element to perform matrix-matrix multiplication by breaking the resulting product matrix into two by two complex sub-matrices and accumulating four complex elements of the resulting sub-matrix as all the cross products of a full two rows of the first input matrix and a full two columns of the second input matrix, the resulting product sub-matrix being stored in the register file.

19. The apparatus of claim 18 wherein the linear array of the processor elements are interconnected in a circular manner such that each processor element can pass complex values to its nearest neighbor in one direction.

20. The apparatus of claim 19 wherein storage of the two matrices to be multiplied together in the register file is organized such that each entire column of each of the input matrices is initially stored in the register file of a single processor element, the storage of all of the columns of both the input matrices being distributed among the processor elements of the array.

21. The apparatus of claim 11 wherein a subset of the processor elements in the linear array of the processor elements are interconnected in a circular manner such that each processor element in the subset can pass complex values to its nearest neighbor in one direction, the array including at least one other processor element not a member of the subset and connected to the rest of the array at only one point in the circle of the subset of processor elements, such that the other processor element can receive the same complex values that are being passed around the circle formed by the subset.

22. The apparatus of claim 21 wherein the linear array is configured to compute a covariance and a cross correlation of an input vector and input scalar, wherein the input vector is a sequence of complex numbers and the input scalar is a complex number that either already exists in the register files of the processor elements or is input through external inputs of the processor elements, each of the processor elements of the subset holding two complex elements of the input vector, the apparatus further comprising:
   a program including instruction words containing sub-instructions to control each the processor element, the sub-instructions being applied to the corresponding processor elements; and
   a sequencer for successively applying the instructions in time to control the functioning of the array in accordance with the program so as to leave a pair of the input vector elements stationary at one pair of inputs of the arithmetic circuitry of each processor element in the subset and leaving the input scalar stationary at an input of the arithmetic circuitry of the processor element not in the subset but attached to the circle, shift the pairs of input vector elements around the circle of the subset of processor elements, control the processor elements in the subset to multiply each the two stationary complex numbers with the pairs of complex numbers being shifted around the circle, and control the processor element not in the subset but attached to the circle to multiply the stationary complex number with the pairs of complex numbers being shifted around the circle, the resulting products being stored in the register file.

23. The apparatus of claim 11 further comprising:
   a bus that can hold one or more complex numbers; and
   a connection from the bus to an input port of the head processor element;
   at least one of the regular processor elements containing a tri-state driver of the bus, the input of each the tri-state driver being driven by its processor element with complex words to pass to the head element, such that the array has a configurable circular connection of a subset of the processor elements, allowing different numbers of the processor elements to be members of the circular interconnection together with the head processor element.

24. The apparatus of claim 11 further comprising:
   a bus that can hold one or more complex numbers; and
   a connection from an output port of the head processor element to the bus;
   at least one of the regular processor elements containing a multiplexer, one input of the multiplexer being driven by the bus and the other input of the multiplexer being driven by an output port of a neighboring processor element, the output of the multiplexer being selectable as values on either one of its inputs, at most one multiplexer being selectable for the input being driven by the bus and the output of the multiplexer being available to the processor element, such that the array effectively has a configurable circular connection of a subset of the processor elements, allowing different numbers of the processor elements to be members of the circular interconnection together with the head processor element.

25. The apparatus of claim 9 wherein at least one of the processor elements has an external port for inputting a complex number from other logic circuitry for subsequent use in a computation performed by the array.

26. The apparatus of claim 9 wherein at least one of the processor elements has an external port for outputting a resulting complex number so that it can be used by other logic circuitry.

27. The apparatus of claim 1 wherein the processing element further includes a non-linear function generator.

28. The apparatus of claim 27 wherein the non-linear function generator comprises:

a normalization circuit operative to scale a variable by shifting the variable into a fixed domain, the normalization logic outputting an exponent value indicating how much the variable was shifted;

a memory for storing tables of values of interpolation coefficients for at least one non-linear function; and logic circuitry for taking only a selected number of the most significant bits of the variable and using the selected number of the most significant bits as an address to look up interpolation coefficients for the function in the table, such that the value of the function at the variable can be approximated by computing an interpolation using the interpolation coefficients.

29. The apparatus of claim 28 wherein the at least one non-linear function comprises at least one of an inverse square root function and a reciprocal function.

30. The apparatus of claim 28 wherein the logic circuitry is further operative to compute a square magnitude of up to two numbers, each of which may be complex, and for forming the sum of the square magnitudes.

31. The apparatus of claim 28 wherein the non-linear function generator further comprises one or more multipliers for forming a product of the non-linear function with real or complex numbers, and denormalization logic that scales the product based on the exponent by shifting.

32. The apparatus of claim 1 wherein the processor element further comprises:

a pipelined delay line operative to output the same sequence of digital words that appeared at its input at an earlier time, multiple members of the sequence traversing the delay line at once in various stages; and a multiplexer that can select its output as either the output of the delay line or the undelayed input sequence of the delay line, the selection being controlled by an input to the processor element.

33. The apparatus of claim 32 wherein external control of the processor elements allows the selection of the output of the multiplexers to facilitate the performance of a plurality of computational algorithms on the linear array, a first subset of the algorithms requiring a delay in passing data from one processor element to the next in the array, and a second subset of the algorithms not requiring a delay in passing data from one processor element to the next in the array.

34. An apparatus comprising:

a plurality of digital processor elements arranged in a linear array, each of the processor elements in the linear array being coupled to at least one other processor element in the array, wherein at least one of the digital processor elements comprises:

arithmetic circuitry operative to multiply real and imaginary parts of at least two complex numbers by real and imaginary parts of at least another two complex numbers thereby forming at least sixteen partial products, and to form one or more additive combinations of the partial products, each of the additive combinations representing a real or imaginary number; and a register file having at least a first port and a second port, each of the first and second ports being capable of reading two complex words or writing two complex words to or from the register file, the ports being coupled to the arithmetic circuitry for supplying the complex numbers thereto and receiving the real or imaginary numbers therefrom.

35. The apparatus of claim 34 wherein the linear array of the processor elements further comprises a head processor element and a plurality of regular processor elements, the head processor element providing a superset of the functionality of each of the regular processor elements.

36. The apparatus of claim 34 wherein the linear array of the processor elements is configured to perform a matrix computation including at least one of a solution of a set of linear equations, a matrix inversion, a matrix-matrix multiplication, and a computation of at least one of covariance and cross correlation.

* * * * *